(12) United States Patent
Dyrka

(10) Patent No.: US 12,127,528 B2
(45) Date of Patent: Oct. 29, 2024

(54) CLEANING SYSTEM AND A CLEANING METHOD ESPECIALLY FOR A MILKING CLUSTER

(71) Applicant: Maciej Dyrka, Nysa (PL)

(72) Inventor: Maciej Dyrka, Nysa (PL)

( * ) Notice: Subject to any disclaimer, the term of this patent is extended or adjusted under 35 U.S.C. 154(b) by 0 days.

(21) Appl. No.: 17/641,576

(22) PCT Filed: Sep. 23, 2020

(86) PCT No.: PCT/IB2020/058869
§ 371 (c)(1),
(2) Date: Mar. 9, 2022

(87) PCT Pub. No.: WO2021/059148
PCT Pub. Date: Apr. 1, 2021

(65) Prior Publication Data
US 2022/0295735 A1   Sep. 22, 2022

(30) Foreign Application Priority Data

Sep. 27, 2019   (PL) .......................................... 431299

(51) Int. Cl.
*A01J 7/02* (2006.01)
*B08B 9/023* (2006.01)
*B08B 9/032* (2006.01)

(52) U.S. Cl.
CPC ............... *A01J 7/025* (2013.01); *B08B 9/023* (2013.01); *B08B 9/0321* (2013.01); *B08B 2209/032* (2013.01)

(58) Field of Classification Search
CPC .......... A01J 7/025; A47L 15/30; A47L 15/32; A47L 15/508; B08B 9/027; B08B 9/032;
(Continued)

(56) References Cited

U.S. PATENT DOCUMENTS 1,399,978 A * 12/1921 Monaghan ............... A47L 15/32
                                                                134/182
1,755,101 A *  4/1930 Fording .................. A47L 15/30
                                                                220/DIG. 28
(Continued)

FOREIGN PATENT DOCUMENTS

CN      104107821 B       5/2017
CN      108078526 A   *   5/2018   ............. A47L 15/22
(Continued)

OTHER PUBLICATIONS

CN108078526—Machine Translation (Year: 2018).*
International Search report for PCT/IB2020/058869, prepared by the European Patent Office, mailing date Dec. 10, 2020, 4 pages.

*Primary Examiner* — Marc Lorenzi
(74) *Attorney, Agent, or Firm* — Ralph E. Jocke; WALKER & JOCKE

(57) ABSTRACT

A cleaning system, in particular for a milking cluster, comprising a basket with a base and with a circumferential structure, the said basket receiving an object to be cleaned, wherein the basket circumferential structure has a plurality of cleaning nozzles arranged thereon, which are directed towards the inside of the basket and fluidly connected with the source of a cleaning agent. A cleaning method is also disclosed, in particular for a milking cluster, performed in this cleaning system.

8 Claims, 16 Drawing Sheets

(58) Field of Classification Search
CPC ... B08B 9/0321; B08B 9/0326; B08B 9/0328; B08B 9/423; B08B 9/023; D06F 17/04; D06F 37/24; D06F 37/245
See application file for complete search history.

(56) References Cited

U.S. PATENT DOCUMENTS

| | | | | |
|---|---|---|---|---|
| 1,832,560 | A * | 11/1931 | Kendig | D06F 17/04 68/148 |
| 2,764,171 | A * | 9/1956 | Nolte | A47L 15/16 134/107 |
| 5,661,989 | A * | 9/1997 | Jeon | D06F 39/083 68/23.5 |
| 6,241,781 | B1 * | 6/2001 | Han | D06F 37/145 68/207 |
| 10,849,304 | B2 | 12/2020 | Krone et al. | |
| 2011/0155068 | A1 | 6/2011 | Maier et al. | |

FOREIGN PATENT DOCUMENTS

| | | |
|---|---|---|
| RU | 180325 U1 | 6/2018 |
| WO | 0011934 | 3/2020 |

\* cited by examiner

Conical streams    "Blade" type streams

CLEANING SYSTEM AND A CLEANING METHOD ESPECIALLY FOR A MILKING CLUSTER

CROSS-REFERENCE TO RELATED APPLICATION

This application is the U.S. national phase of PCT Application No. PCT/IB2020/058869 filed on Sep. 23, 2020, which claims priority to PL Patent Application No. P.431299 filed on Sep. 27, 2019, the disclosures of which are incorporated in their entirety by reference herein.

The object of the present invention is a cleaning system and a cleaning method especially for a milking cluster. The objects of the invention are implemented especially for precise and quick cleaning and disinfecting of milking clusters used in dairy cow milking parlors, in hospitals for sick cows, and in barns related to milking, the so-called tie-stall barns or pipeline milking barns.

One of the most important causes of economic losses in dairy cow farming is mastitis, which manifests itself in a swollen udder, in an increased temperature, or in abnormal consistency, color and composition of the milk, as well as in a substantial growth of the somatic cell count, resulting in significantly lowered quality of the milk, reduced milk production, and the related medical treatment costs and milk withdrawal time. In general opinion, mastitis is most typically caused by bacteria, mycoplasmas, fungi and algae. Practical measures taken in order to prevent or reduce the frequency of mastitis in cows include using agents which ensure a proper milking hygiene. Milking clusters commonly used in milking parlors may be frequently one of the links in the transmission of pathogens causing mastitis in cows. Therefore, ensuring a proper milking hygiene entails the need to clean and disinfect the clusters, as they frequently become dirty with cow excreta. Also, their manual operation creates a possibility of bacteria being transferred from one cow to another by the direct contact of the milking cluster with the gloves of the milker. Moreover, after milking, the cluster may contain (and typically contains) some residues of the milk from the previously milked cow. As a result, placing the cluster on another cow may cause cross-contamination, which entails the need to introduce an antibiotic therapy and milk withdrawal time, and thus entails additional costs.

Russian utility model application RU180325U1 discloses an apparatus for washing milking machines. By increasing the intensity of the hydromechanical effect on the inner walls of the liners tensioned in the teat cups, the said machine provides shorter process time of washing milking machines, thus improving the washing quality. The machine comprises a platform with an external channel for delivering the washing agent. On the surface of the platform, four collectors are arranged in the form of candles for connecting to the teat cups, and clamps for hermetically fastening the teat cups. The candles are in the form of cones being provided on their outer surfaces with nozzles which spray the washing agent and with brush parts which remove impurities from the inner surfaces of the teat cups. The candles are mounted on rotatable pins to allow them to rotate during the stage of washing the inner surfaces of the teat cups.

International patent document WO2013135832A1 discloses a space divider of a milking parlor arrangement with at least one milking parlor (milking stall). The space divider in the form of a barrier is arranged in parallel to the longitudinal axis of the animal and has an arm with a milking cluster, which can be moved from the park position to the operating position. The space divider is provided with a cleaning device which comprises cleaning nozzles. The cleaning device is in the form of candles with cleaning nozzles (nozzles arranged at the top of the cone and/or radial nozzles) on which the teat cups are positioned. The cleaning nozzles spray the washing agent on the inner surface of the liners tensioned in the teat cups. After the washing stage, the cleaning nozzles may also deliver air for drying the inside of the liners and of the teat cups.

U.S. patent document US2011155068A1 discloses a cleaning system for teat cups, in particular for the inner surfaces of liners tensioned in teat cups, which comprises a dispensing device allowing at least two different cleaning fluids to be introduced inside a liner tensioned inside a teat cup in such a way as to enable an intermediate disinfection between individual milking processes. The cleaning system comprises a dispensing device in the form a candle, with the liner inside the teat cup appropriately positioned thereon for cleaning. The cleaning system comprises four dispensing devices arranged in an appropriate mounting. Moreover, spray means are provided with one or multiple outlets for spraying the outer surfaces of teat cups with a cleaning agent. Thereby the outer surfaces of the teat cups are cleaned. The spray means can be activated when the teat cups are introduced into the cleaning system to allow a more effective cleaning of the outer surface along the increased surface of the liner which is in operation on the teat.

International patent document WO0011934A1 discloses a device for milking dairy animals which comprises teat cups with liners moved under the influence of gravity to a storage system and/or teat cup cleaning means. The storage system and/or the means for cleaning liners in teat cups comprises guidance means for teat cups provided with a chute having a U-shaped cross-section. The system for the storage and cleaning of liners in teat cups is in the form of a box with supporting walls forming four compartments for receiving teat cups. Each compartment is provided with spray outlets which spray cleaning fluid for cleaning the outer surfaces of teat cup liners. In order to clean the inside surface of liners tensioned in teat cups, the system for the storage and cleaning of liners may be provided with sprayers or brushes which project horizontally into the open ends of each teat cup liner.

The technical problem of the present invention is to offer such a cleaning system intended in particular for milking clusters, and such a cleaning method, which will provide precise cleaning, disinfecting and possibly drying of the elements placed in the cleaning system, in particular removing dried animal excreta and milk residues remaining in the head of the liner as a result of milking the previous cow, the said cleaning operation being performed over a short period of time and with the use of less cleaning agent. In addition it is desired that the cleaning system allows cleaning the inner surfaces of the milking clusters, in particular the inner surfaces of the teat cup liners, the claw and the pulse tubes, thus ensuring that the milk remaining in the milking cluster is cleaned and that any pathogens causing mastitis, such as bacteria, mycoplasmas, fungi, viruses and algae, are eliminated. It is also desired that the cleaning system and the cleaning method allow the cleaning process to be automatized and the work done by the operator to be reduced. It is further desired to provide a cleaning system which will facilitate the positioning of the milking cluster and accelerate the entire cleaning operation.

The first object of the present invention is a cleaning system, in particular for a milking cluster, comprising a basket with a base and with a circumferential structure, the said basket receiving an object to be cleaned, characterized in that the basket circumferential structure has a plurality of cleaning nozzles arranged thereon, which are directed towards the inside of the basket and fluidly connected with the source of a cleaning agent.

In a preferred embodiment of the invention, the cleaning system comprises an inner pin arranged coaxially with respect to the basket and extending vertically from the basket base, wherein the inner pin has a plurality of cleaning nozzles arranged thereon and directed towards the outside of the basket, wherein the cleaning nozzles are fluidly connected with the source of a cleaning agent.

In another preferred embodiment of the invention, the inner pin comprises at least one cleaning nozzle, fluidly connected with the source of a cleaning agent, the at least one cleaning nozzle being arranged at the inner pin end opposite with respect to the basket base and directed towards the outside, substantially along the symmetry axis of the basket.

In another preferred embodiment of the invention, the cleaning system comprises a dispensing head fluidly connected with the source of a cleaning agent and delivering the cleaning agent to the cleaning nozzles through fluid tubes.

The cleaning system preferably comprises a stationary support structure including a lower support plate and an upper support plate connected to each other with support plate mounting props, wherein the stationary support structure surrounds the basket.

Also preferably, the cleaning system comprises a positioning structure arranged inside the basket and including a plurality of spokes converging towards the base around a plurality of positioning openings provided in the base.

More preferably, the positioning structure is an element independent with respect to the basket and placed inside the basket and in addition it comprises a lower positioning ring, a middle positioning ring and an upper positioning ring, wherein the lower positioning ring, the middle positioning ring and the upper positioning ring are in a one-over-another arrangement and are connected with connectors, and the spokes are connected in two in-row arrangements, wherein the first in-row arrangement of spokes extends between the upper positioning ring and the middle positioning ring, while the second in-row arrangement of spokes extends between the middle positioning ring and the lower positioning ring.

In a preferred embodiment of the invention, the middle positioning ring comprises positioning ribs which extend towards the rotational symmetry axis of the basket and which define free spaces.

In another preferred embodiment of the invention, the lower positioning ring comprises a plurality of through holes which are arranged substantially in accordance with the positioning openings provided in the base.

In a still another preferred embodiment, the positioning structure is supported with the upper positioning ring against the upper support plate.

The cleaning system preferably comprises a plurality of cleaning nozzles mounted to the lower support plate, directed towards the basket, and fluidly connected with the source of a cleaning agent, wherein the cleaning nozzles mounted to the lower support plate are arranged substantially in accordance with the positioning openings provided in the base.

Also preferably, the cleaning system comprises a drive system for setting the basket in a rotational motion, wherein the drive system is mounted to the basket base and to the lower support plate.

Still preferably, the cleaning system comprises a support plate arranged inside the basket, at a distance from the basket base and connected to the basket base by means of pegs.

In a preferred embodiment of the invention, the cleaning system comprises a plurality of candles extending from the base towards the inside of the basket, substantially parallel to the symmetry axis of the basket, wherein the candles pass through the positioning openings provided in the base, and are fluidly connected with the source of a cleaning agent.

In another preferred embodiment of the invention, the circumferential structure of the basket comprises a plurality of circumferential rings arranged in a one-over-another arrangement and connected by means of connecting pipes which are arranged along the circumference and which have the cleaning nozzles arranged thereon.

In another preferred embodiment of the invention, a plurality of circumferential rings is additionally connected with each other via ring connectors.

Preferably, the drive system is an electric drive with belt transmission, an electric drive with gear chain transmission, an electric drive with bevel transmission, an electric drive with hybrid transmission, a fluid drive powered with air or a fluid drive powered with liquid.

Also preferably, the cleaning nozzles are blade nozzles, conical nozzles or stream nozzles.

The second object of the present invention is a cleaning method, in particular for a milking cluster, performed in the cleaning system according to the first object of the present invention, characterized in that an element to be cleaned is inserted into the basket and the source of a cleaning agent which supplies the cleaning agent to the cleaning nozzles is activated.

The cleaning system and the cleaning method of the present invention provide precise cleaning, disinfection and drying of elements placed in the cleaning system. The objects of the present invention provide precise cleaning in particular of milking clusters. By providing a plurality of cleaning nozzles on the circumferential structure of the cleaning system basket, it is possible to perform a precise cleaning of the outer surface of the milking cluster, and in particular to remove dried excreta of dairy animals. The use of the inner pin with the cleaning nozzles arranged thereon increases the effectiveness of the cleaning and disinfection operations, and accelerates the entire process, allowing the cleaning agent to access all of the outer surfaces of the milking cluster. Additionally, setting the basket in a rotational motion allows the cleaning operation to be accelerated, as no need exists to direct the cluster, and thus all of its surfaces, towards the cleaning nozzles, and also less cleaning agent to be used, in particular when the basket circumferential structure is provided with blade nozzles which allow the milking cluster to be cleaned from dirt (by cutting dirt off) and disinfected, and with conical nozzles which allow the milking cluster to be cleaned, rinsed and additionally disinfected. Moreover, the use of the rotational system protects against one of the circumferential nozzles becoming clogged for example by scale in the water. When the nozzle becomes clogged, or its cleaning surface (in conical nozzles) or its cleaning angle (in conical or blade nozzles) become limited, the cleaning and disinfecting function is taken over by another nozzle along the circumference. The use of the positioning structure arranged inside the basket additionally facilitates the positioning of the milking cluster and accelerates the entire cleaning operation, by limiting to a minimum the operations performed manually by the operator. Thereby the work ergonomics is significantly improved and the possibility to automatically insert and position the milking cluster is provided. Moreover, the use of cleaning candles penetrating inside the liner or of cleaning nozzles arranged on the lower support plate and vertically directed towards the basket, in particular of stream nozzles having point-shaped stream, allows the cleaning agent to be introduced inside the milking cluster, in particular inside the liners tensioned in the teat cups, and inside the claw, thereby additionally improving the cleaning and disinfecting process, and ensuring that the milk remaining in the milking cluster and any pathogens causing mastitis are removed.

DETAILED DESCRIPTION

EXAMPLE 1

Figure 1A:
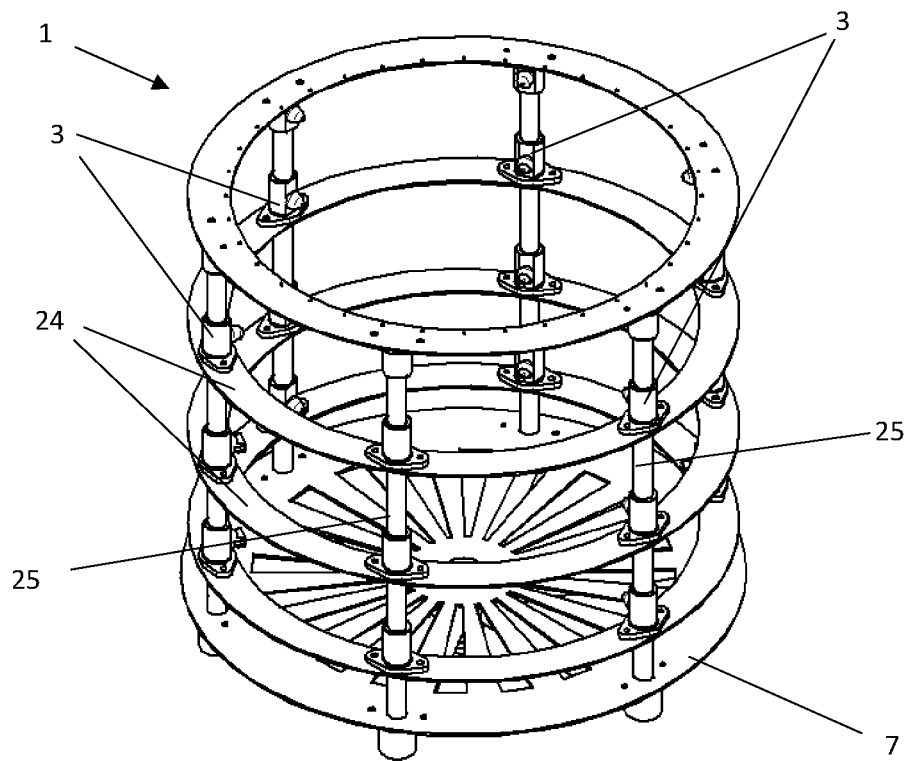
FIG. 1A is in axonometric view of the cleaning system according to a first embodiment of the invention.
Figure 1B:
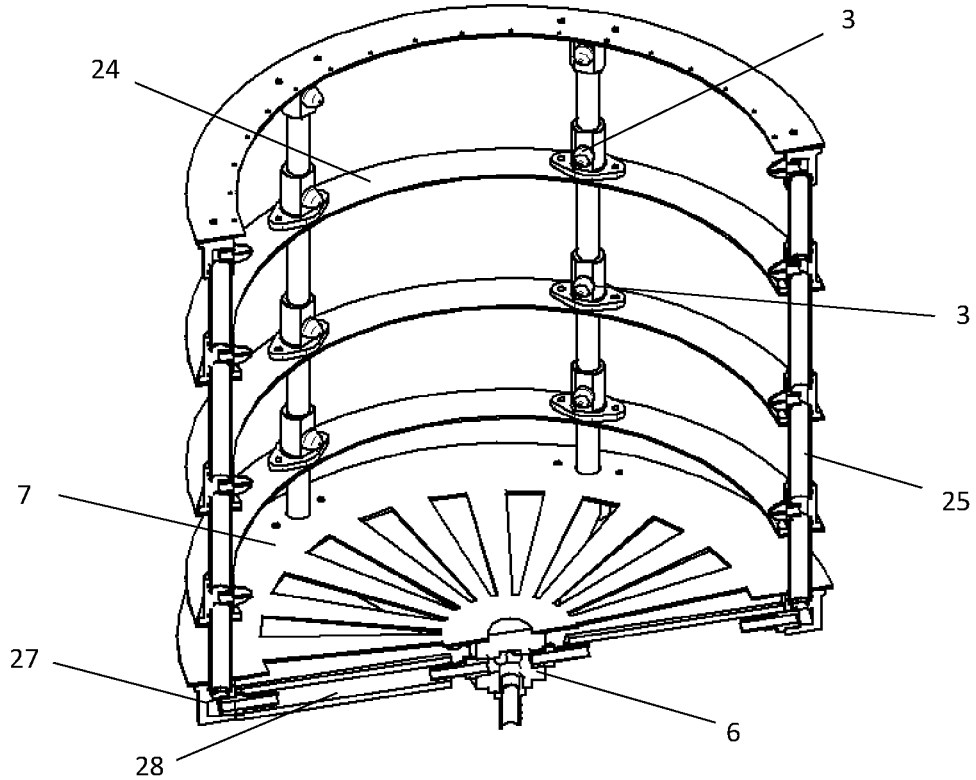
FIG. 1B is a partial cross-sectional axonometric view of the system of FIG. 1A.
Figure 1C:
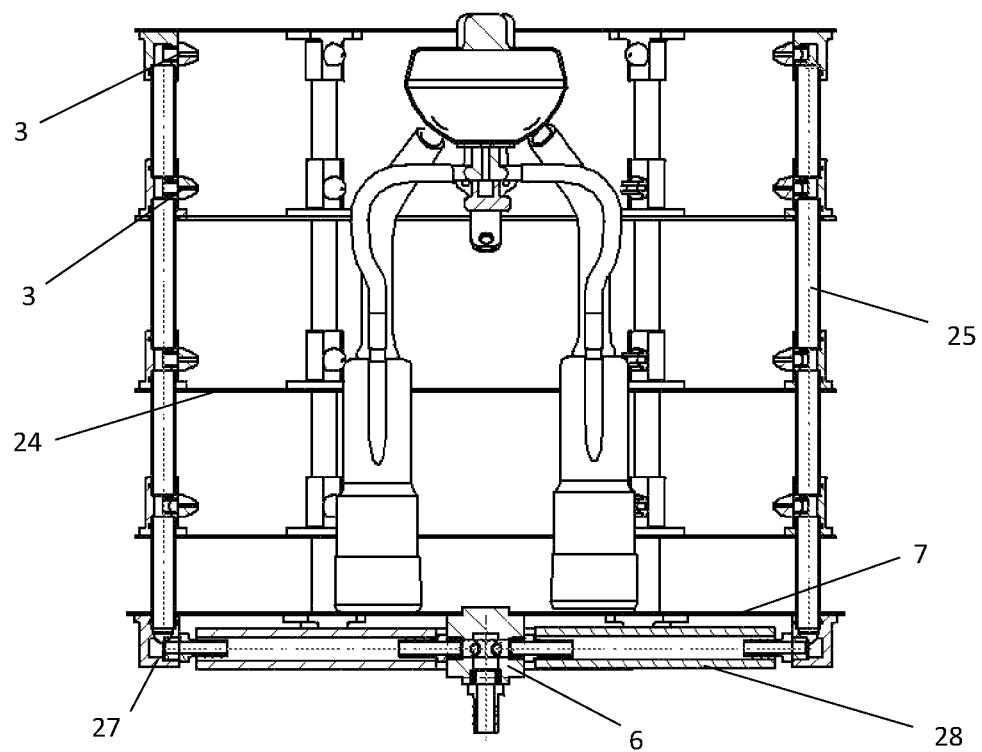
FIG. 1C is a schematic cross-sectional side view of the cleaning system of FIG. 1A with the milking cluster placed inside.

An example of a cleaning system according to the present invention, intended for cleaning and disinfecting milking clusters, is schematically shown in FIGS. 1A-1C. In general, the cleaning system comprises a basket 1, the inside of which receives a milking cluster (as shown in FIG. 1C). The basket 1 comprises a base 7 with a perimeter from which a circumferential structure extends vertically. The circumferential structure extends to a height which substantially corresponds to the height of the milking cluster in such a way that after it is inserted into the basket 1, the cleaning system surrounds substantially the entire height of the milking cluster. The circumferential structure consists of circumferential rings 24 arranged in a one-over-another arrangement, at a distance from each other. In this embodiment, four circumferential rings 24 are shown, but the number of the circumferential rings and their geometry are not a limitation to the present invention and alternative embodiments may comprise a greater or smaller number of circumferential rings 24 arranged in various arrangements.

The circumferential rings 24 are connected to each other by vertically extending connecting pipes 25. The connecting pipes 25 are arranged along the circumference of the base 7 and of the circumferential rings 24 and extend vertically upwards the circumferential structure, thus connecting the individual circumferential rings 24 and the base 7 and as a result providing stability to the circumferential structure. In this embodiment, six serial arrangements of the connecting pipes 25 are shown arranged at equal distances along the circumference of the circumferential structure, it should be stressed however that neither the number of serial arrangements of the connecting pipes 25 nor their geometric arrangement in the circumferential structure is a limitation to the scope of the present invention.

As is best represented in FIG. 1C, the serial arrangements of the connecting pipes 25 pass through the base 7, and end with connecting elbows 27 below the base 7 thereby providing a fluid connection with the source of a cleaning agent. On the central axis of the basket 1, under the base 7, there is arranged a dispensing head 6, which comprises radially extending fluid outlets and a vertically extending fluid inlet. In this embodiment, the dispensing head 6 has six fluid outlets extending radially outwards for providing a leakproof fluid connection through elastic fluid tubes 28 with the connecting elbows 27 and further with the serial arrangements of the connecting pipes 25. The fluid inlet of the dispensing head 6 has a leakproof connection with the source of a cleaning agent thereby providing leakproof operation of the entire fluid system and the delivery of the cleaning agent at a required pressure.

As shown in FIGS. 1A-1C, the circumferential structure of the basket 1 comprises a plurality of cleaning nozzles 3. In the present embodiment of the cleaning system according to the invention, the circumferential structure of the basket 1 is provided with 24 cleaning nozzles 3. The cleaning nozzles 3 are mounted along the serial arrangements of the connecting pipes 25, providing a leakproof fluid connection, and are located directly over (or below, in the case of the top row of the cleaning nozzles) the circumferential rings 24 of the basket. The cleaning nozzles 3 are blocks of cleaning nozzles comprising any components required to properly operate and dispense the cleaning agent, and to provide a solid and secure fastening to the connecting pipes 25 and to the circumferential rings 24. The fastening of the cleaning nozzles 3 to the connecting pipes 25 and to the circumferential rings 24 of the basket additionally stabilizes the circumferential structure of the basket 1, providing greater strength and durability. The cleaning nozzles 3 are directed towards the inner space of the basket 1, dispensing the cleaning agent onto the milking cluster placed inside the basket 1.

In this embodiment, conical cleaning nozzles 3 are used. The conical cleaning nozzles 3 are located on the circumferential structure of the basket 1 and when operating they deliver a conically shaped stream of a cleaning agent, cleaning and rinsing the outer surface of the milking cluster. In this configuration, precise cleaning of the dirt and disinfecting of the milking cluster requires the cleaning agent to be delivered at a relatively high pressure.

It should be noted, however, that the number of the cleaning nozzles 3 and their arrangement are not a limitation to the scope of the present invention, and it is possible in alternative embodiments to use a smaller or a greater number of cleaning nozzles 3, arranged in different configurations, on condition that such a structure will ensure a satisfactory coverage of the outer surface of the milking cluster with streams of the cleaning agent emitted from the cleaning nozzles 3. Importantly, the cleaning nozzles must allow the entire milking cluster to be cleaned by covering its entire dirty surface.

EXAMPLE 2

The second embodiment of the cleaning system according to the present invention is schematically shown in FIGS. 2A-2D. The structure of the cleaning system according to the second embodiment of the invention is substantially similar to the structure of the cleaning system according to the first embodiment, and therefore the description of the identical structural elements has been omitted for clarity.

Figure 2:
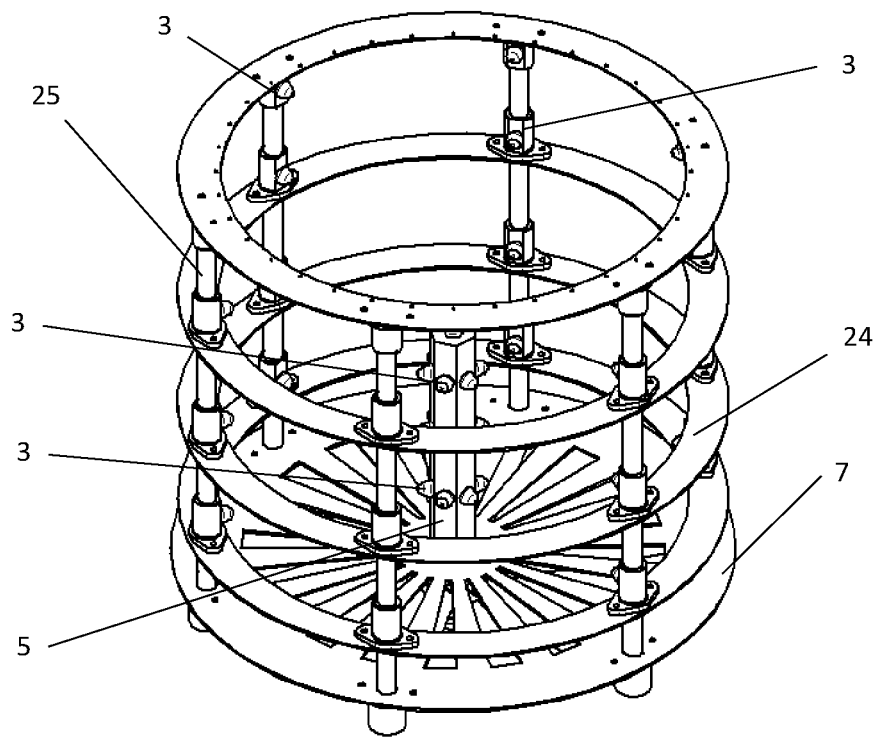
FIG. 2A is an axonometric view of the cleaning system according to a second embodiment of the invention.
FIG. 2B is a partial cross-sectional axonometric view of the system of FIG. 2A with the milking cluster placed inside.
FIG. 2C is a schematic cross-sectional side view of the cleaning system of FIG. 2A.
FIG. 2D is in axonometric view which is an enlarged view of the inner pin of FIG. 2A.
FIG. 2E is a schematic cross-sectional side view of the cleaning system of FIG. 2A with the milking cluster placed inside and with the indicated cross-sections of streams emitted from the cleaning nozzles.
FIG. 2F is a schematic top view of the cleaning system of FIG. 2A with the milking cluster placed inside and with the indicated geometry of streams emitted from the cleaning nozzles.
Figure 2:
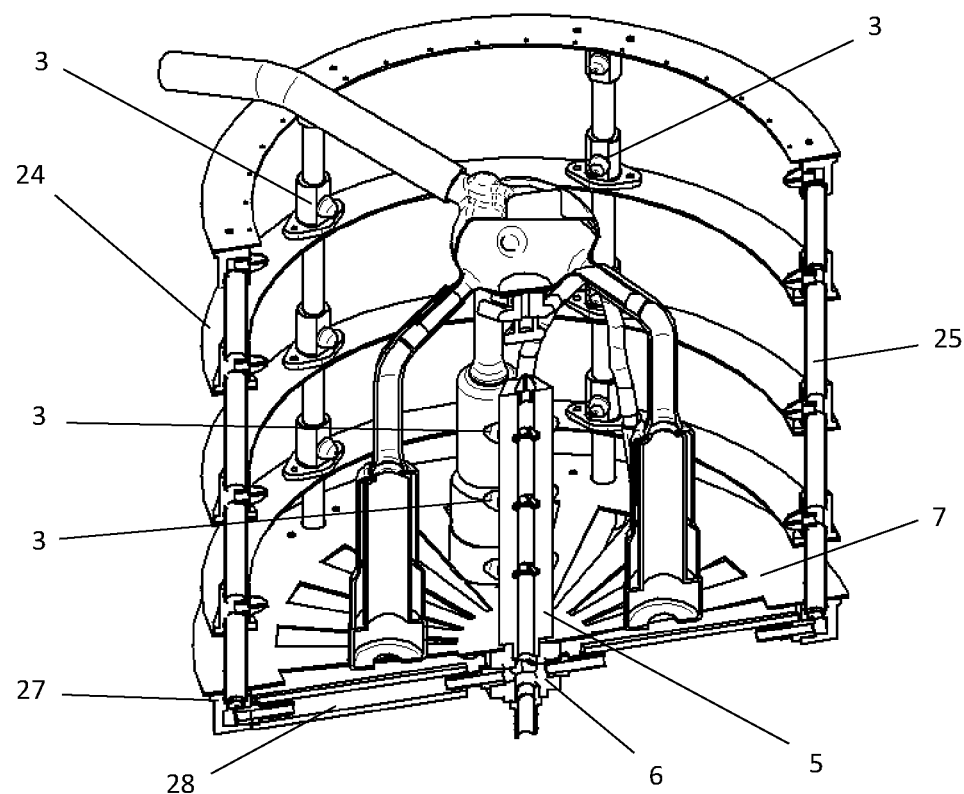
Figure 2C:
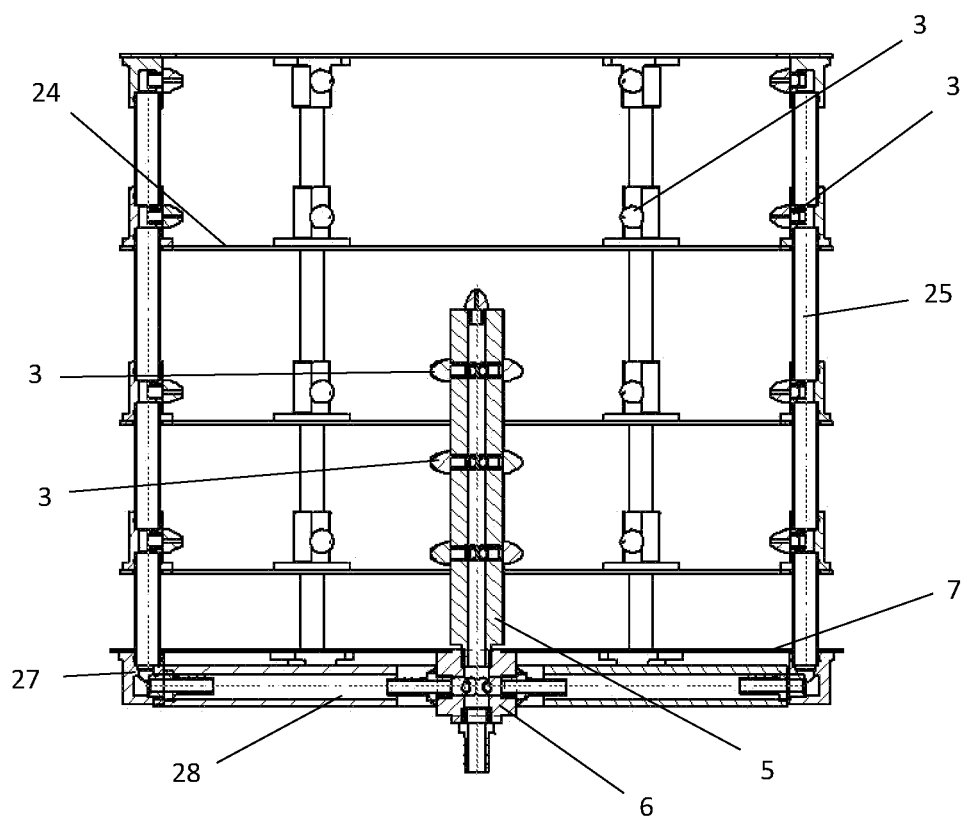
Figure 2D:
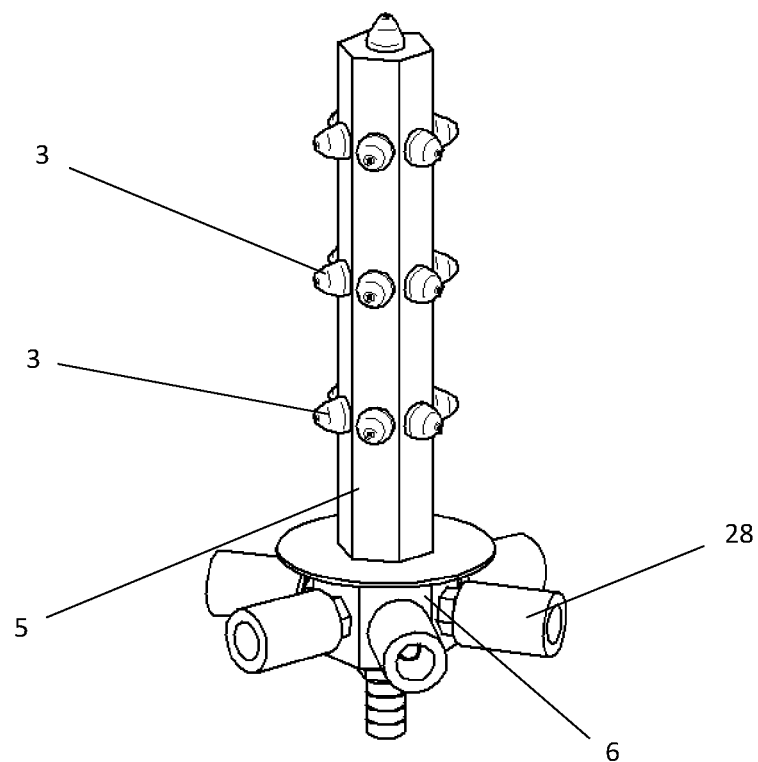

Unlike in the first embodiment, the cleaning system of the second embodiment comprises an inner pin 5 which extends vertically from the base 7 along the longitudinal axis of the basket 1. The inner pin 5 is mounted on the dispensing head 6 and is fluidly connected with it for delivering a cleaning agent to the inner pin 5. The inner pin 5 is best shown in FIG. 2D. The inner pin 5 is a pipe element hollow inside, and the cross-section of the inner pin 5 is a hexagonal structure. The geometry of the cross-section of the inner pin 5 is not a limitation to the scope of the present invention, and it is possible in alternative embodiments to have different cross-section geometries, e.g. triangular, square, circular.

There is a plurality of cleaning nozzles 3 arranged on the outer surfaces of the inner pin 5 side walls, the cleaning nozzles 3 being directed towards the outside of the inner pin 5, and towards the circumferential structure of the basket 1. In this embodiment, the inner pin 5 is provided with 19 cleaning nozzles 3, of which 18 cleaning nozzles 3 are arranged on the inner pin 5 side walls, and one cleaning nozzle 3 is arranged at the inner pin 5 end opposite with respect to the basket 1 base 7. The cleaning nozzle 3 located at the end of the inner pin 5 is directed in accordance with the longitudinal axis of the basket 1.

As in the first embodiment, the cleaning nozzles 3 are conical cleaning nozzles 3, and the cleaning agent which they emit under pressure covers the entire dirty surface of the milking cluster.

Figure 2E:
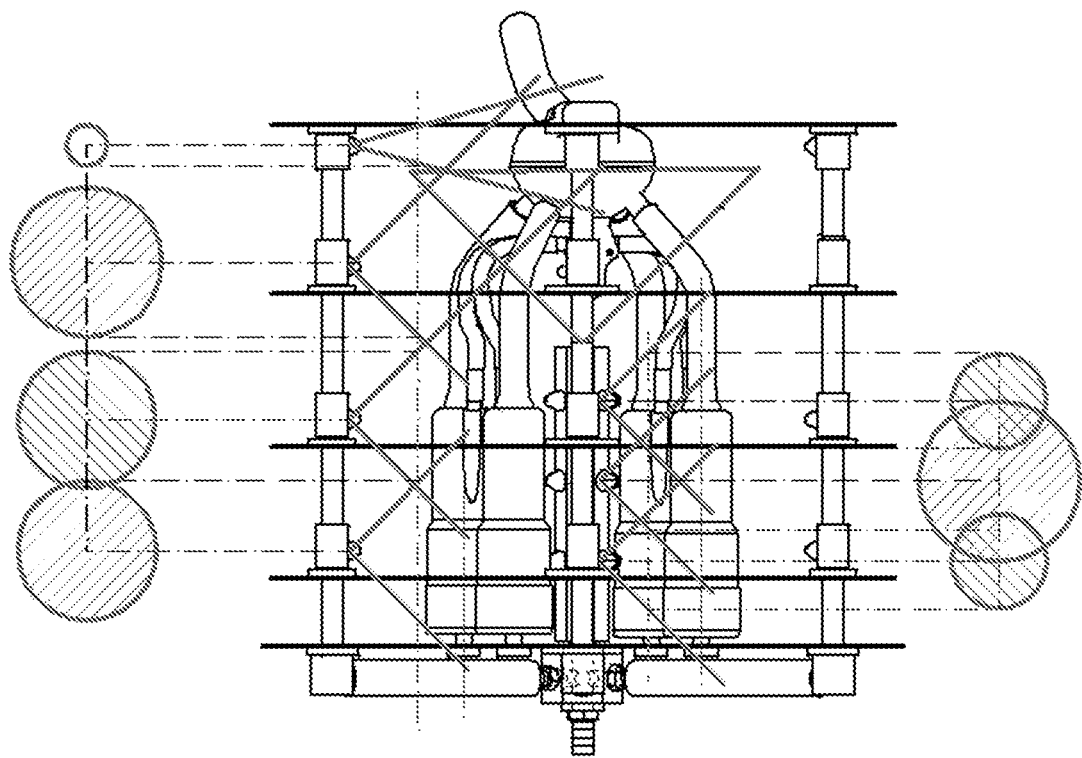
Figure 2F:
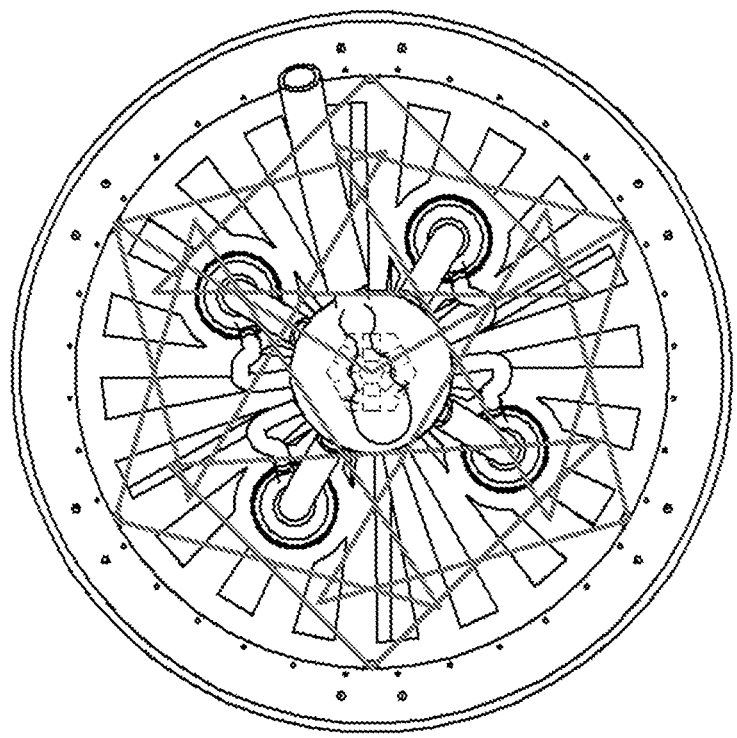

FIGS. 2E and 2F show non-limiting examples of the configurations of cleaning agent streams emitted from the cleaning nozzles 3 located both on the circumferential structure of the basket 1 and on the inner pin 5. The hatched circles in FIG. 2E represent cross-sections of the cleaning agent streams at the intersection point with the vertical dotted lines. In FIG. 2F, the thick continuous lines indicate the directions of the emitted cleaning agent streams. Importantly, such configuration and geometry of the cleaning agent streams allows a complete coverage of the outer surfaces of the milking cluster subjected to cleaning.

EXAMPLE 3

The third embodiment of the cleaning system according to the present invention is schematically shown in FIGS. 3A-3D. The structure of the cleaning system according to the third embodiment of the invention is substantially identical to the structure of the cleaning system according to the second embodiment, and therefore the description of the identical structural elements has been omitted for clarity.

Figure 3:
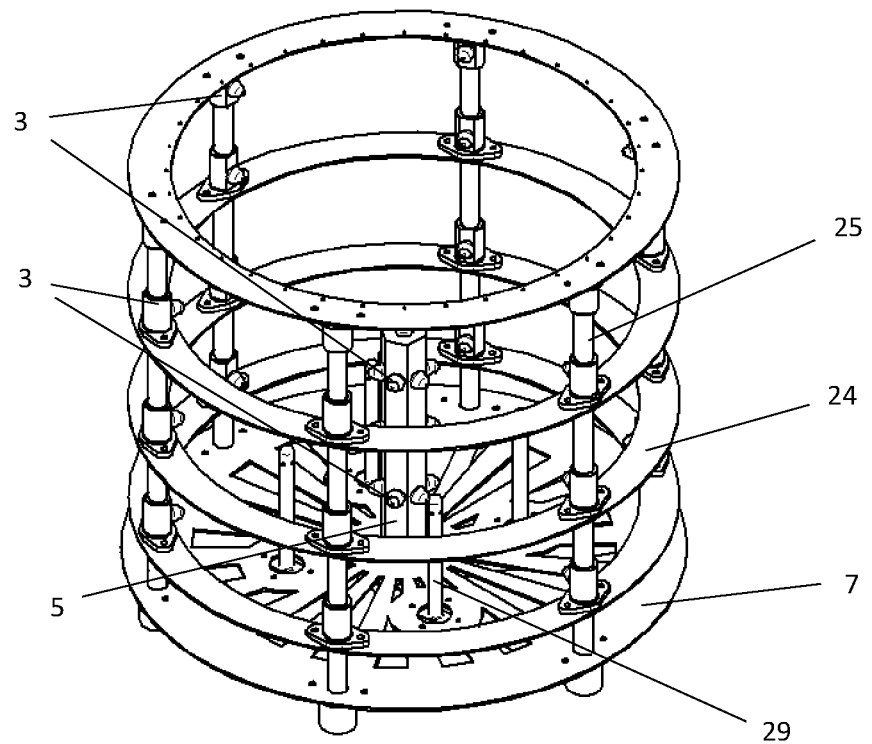
FIG. 3A is an axonometric view of the cleaning system according to a third embodiment of the invention.
FIG. 3B is a partial cross-sectional axonometric view of the system of FIG. 3A with the milking cluster placed inside.
FIG. 3C is a schematic cross-sectional side view of the cleaning system of FIG. 3A.
FIG. 3D is in axonometric view which is an enlarged view of the inner pin and of the candles of FIG. 3A.
Figure 3:
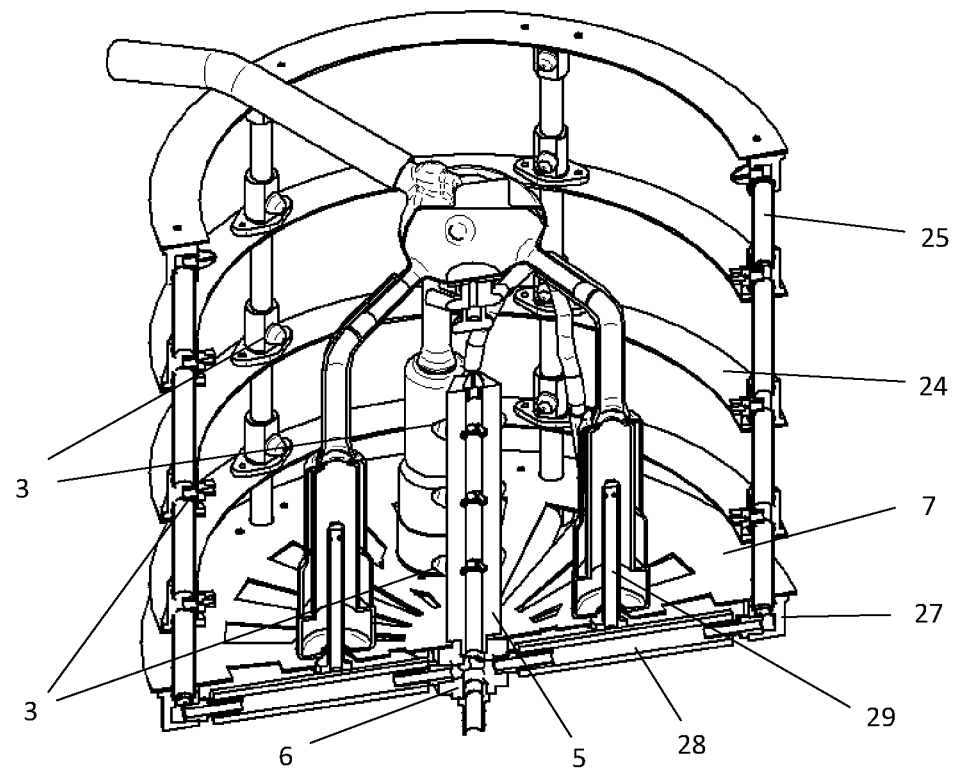
Figure 3C:
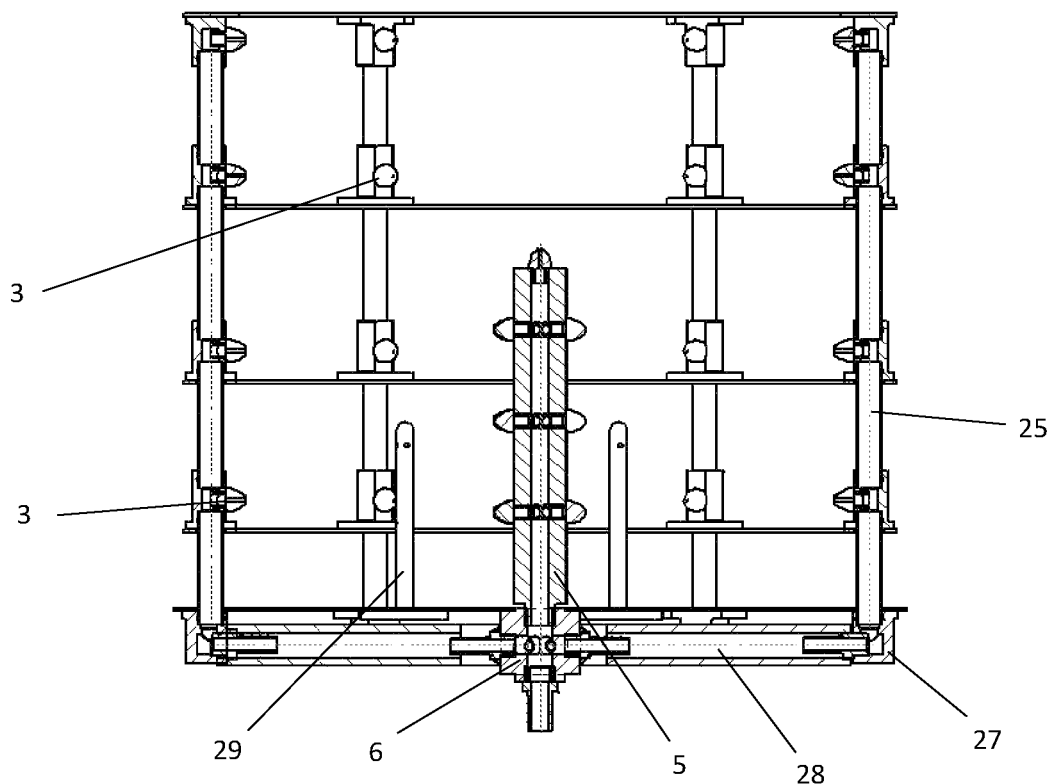
Figure 3D:
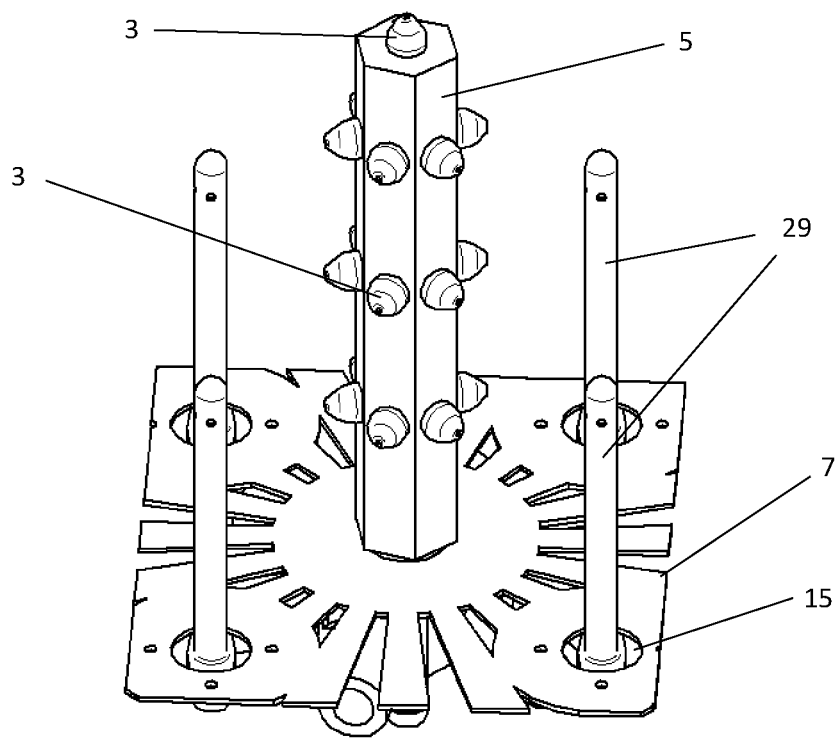

Unlike in the second embodiment, the cleaning system of the third embodiment additionally comprises candles 29 which extend vertically from the base 7 in parallel to the longitudinal axis of the basket 1. As best illustrated in FIG. 3D, the presented embodiment comprises four candles 29, which assume the form of needles with rounded ends, the end region being provided with openings for delivering a cleaning agent. The four candles 29 are arranged at equal distances from the longitudinal axis of the basket 1. The number and location of candles 29 depend on the type of an element subjected to cleaning and in the case of cow milking clusters there are four candles 29 arranged approximately in the mid-length of the radius of a circle circumscribing the base 7. As illustrated in FIG. 3B, when the cleaning system is in operation, the milking cluster is introduced inside the basket 1 in such a manner that the teat cup liners are placed on the candles 29.

Moreover, the base 7 is provided with positioning openings 15, through which the candles 29 pass and connect with the fluid tubes 28 extending below the base 7. Thus a fluid connection is provided between the candles 29 and the source of a cleaning agent.

EXAMPLE 4

The fourth embodiment of the cleaning system according to the present invention is schematically shown in FIGS. 4A-4D. The structure of the cleaning system according to the fourth embodiment of the invention is substantially identical to the structure of the cleaning system according to the third embodiment, and therefore the description of the identical structural elements has been omitted for clarity.

Unlike in the third embodiment, the cleaning system of the fourth embodiment additionally comprises a positioning structure integral with the basket 1. The positioning structure is designed to facilitate inserting of the milking cluster into the cleaning system, i.e. into the inside of the basket 1, particularly in such a manner that the candles 29 enter the inside of the liners tensioned in the teat cups. The positioning structure is in the form of a plurality of spokes 14 comprising stiff metal rods arranged in several in-row arrangements. The spokes 14 are mounted directly to the circumferential rings 24 of the basket 1 and form guides for facilitating the positioning of the milking cluster. The first row of the spokes 14 is mounted to the upper circumferential ring 24 in appropriate mounting openings which allow the ends of the spokes 14 to be passed through. The second ends of the first row of the spokes 14 are mounted in various positions to the second, as viewed from the base 7, circumferential ring 24, also in appropriate mounting openings. The second, as viewed from the base 7, circumferential ring 24 is provided with positioning ribs 21 which extend towards the axis of the rotational symmetry of the basket 1 and which define free spaces for inserting teat cups. Part of the openings for mounting the second ends of the first row of the spokes 14 is arranged along the appropriate positioning ribs 21.

Figure 4:
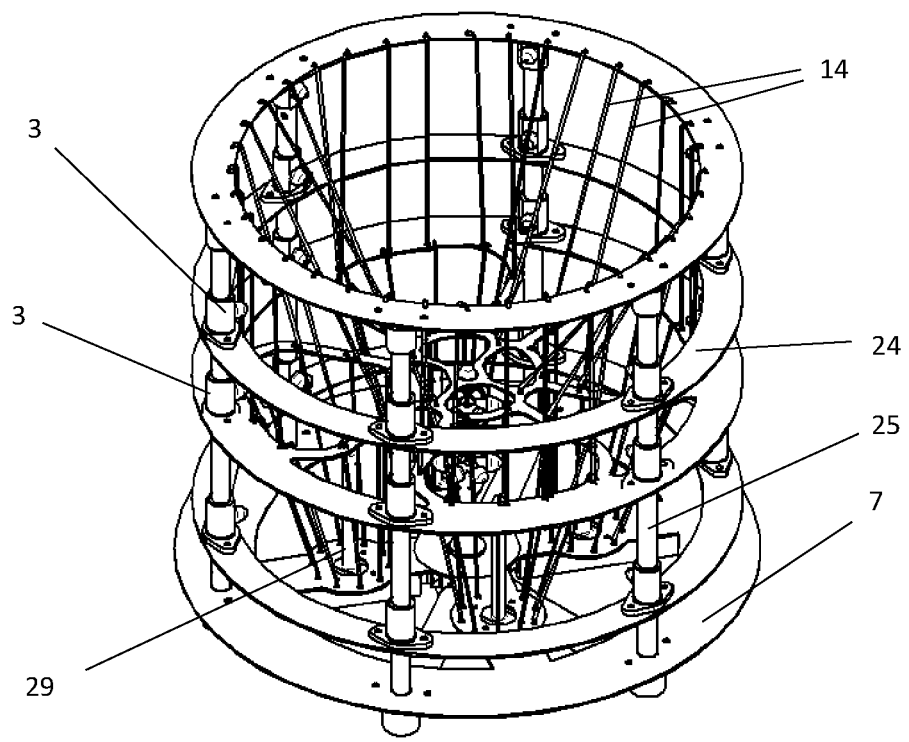
FIG. 4A is in axonometric view of the cleaning system according to a fourth embodiment of the invention.
FIG. 4B is a partial cross-sectional axonometric view of the cleaning system of FIG. 4A.
FIG. 4C is a schematic cross-sectional side view of the system of FIG. 4A with the milking cluster placed inside.
FIG. 4D is a partial axonometric cross-sectional view of the cleaning system of FIG. 4A with the milking cluster placed inside.
Figure 4:
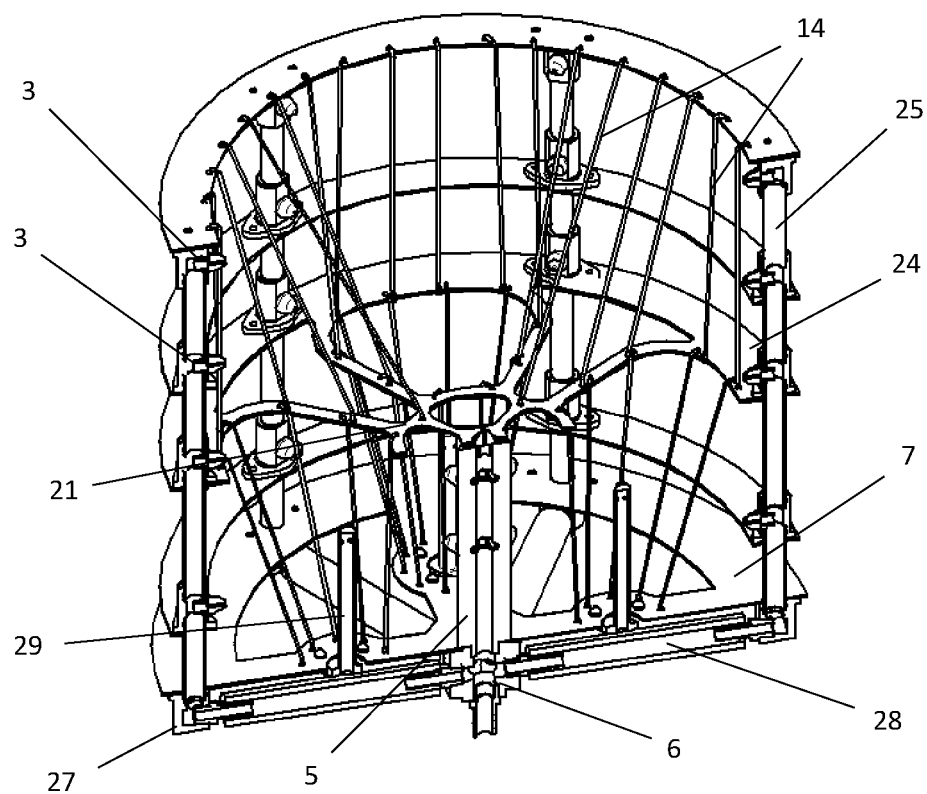
Figure 4C:
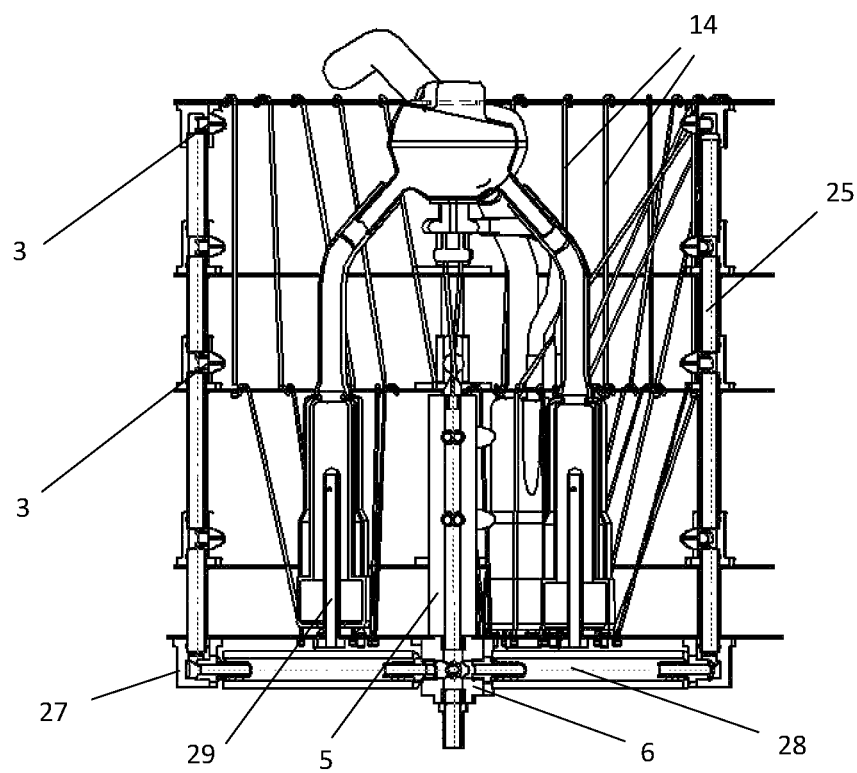
Figure 4D:
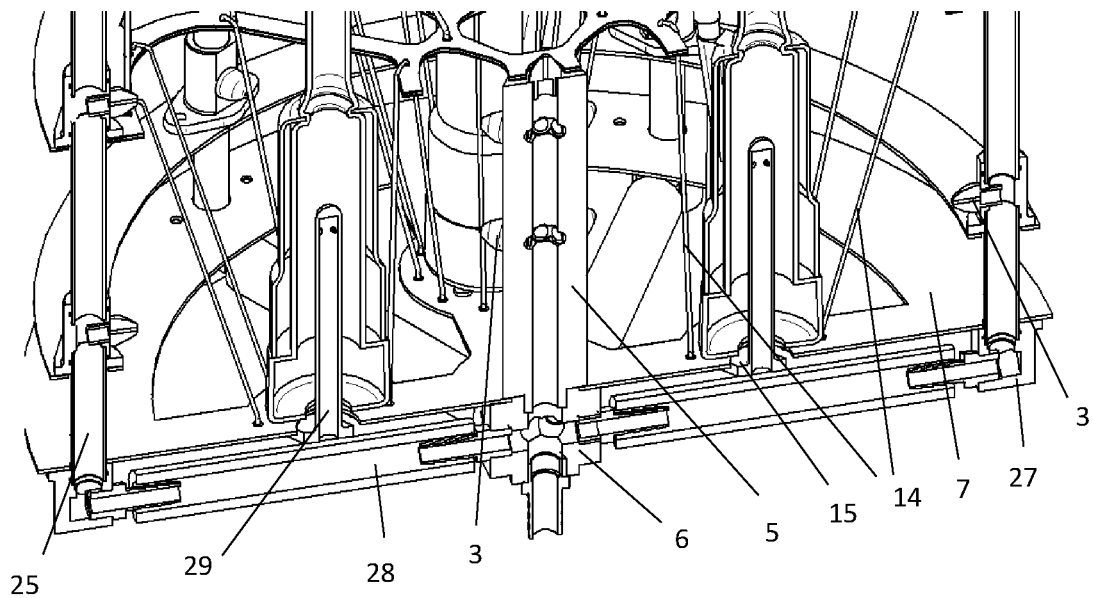

The second row of the spokes 14 extends from the second, as viewed from the base 7, circumferential ring 24 towards the base 7, with the spokes 14 being mounted to the corresponding mounting openings provided in the circumferential ring 24 and in the base 7. As best illustrated in FIG. 4D, the mounting openings in the base 7 are provided around the corresponding positioning openings 15, through which the candles 29 extend. Thus the spokes 14 in the second row extend from the base 7 towards the second, as viewed from the base 7, circumferential ring 24, expanding and joining around the space defined by the positioning ribs 21 and by a part of the circumference of the circumferential ring 24. Such a construction provides a positioning structure which facilitates inserting the milking cluster into the proper position.

It should be stressed that in alternative embodiments both the number of spokes and their spatial arrangement may differ from those presented in this fourth embodiment and may be selected to match the structure and the geometric dimensions of the milking cluster. Moreover, the candles 29 may be substituted with stream cleaning nozzles which inject a stream of a cleaning agent into the inside of the liner.

EXAMPLE 5

The fifth embodiment of the cleaning system according to the present invention is schematically shown in FIGS. 5A-5G. The structure of the cleaning system according to the fifth embodiment of the invention is similar to the structure of the cleaning system according to the first embodiment, and therefore the description of the identical structural elements has been omitted for clarity.

Unlike in the first embodiment, the cleaning system of the fifth embodiment comprises an outer, stationary support structure 17 which includes a lower support plate 18, an upper support plate 19 and four support plate mounting props 20 arranged in the corners of the support plates 18, 19 and connecting the lower support plate 18 with the upper support plate 19. The basket 1 is arranged inside the support structure 17 and has a structure similar to the structure of the basket 1 according to the first embodiment. Unlike the structure of the basket 1 according to the first embodiment, the basket 1 according to this embodiment of the cleaning system comprises the base 7 which is arranged below the connecting elbows 27 of the fluid tubes 28 and below the dispensing head 6. The structure of the basket 1 is presented in detail in FIGS. 5D and 5E. A support plate 22 is mounted on the dispensing head 6, above the fluid tubes 28, and it is connected with the base 7 by means of pegs 23. Moreover, unlike the basket 1 according to first embodiment of the invention, the basket 1 according to the fifth embodiment of the invention comprises four systems of serial connecting pipes 25 arranged at equal distances along the circumference of the circumferential structure, with each of the pipe 25 systems having four cleaning nozzles 2, 3 arranged thereon, thus providing 16 cleaning nozzles 2, 3. The blade nozzles 2 are arranged every 180° along the circumference of the basket 1, while the conical cleaning nozzles 3 are arranged every 180° along the circumference of the basket 1, in a position shifted by 90 degrees in relation to the blade cleaning nozzles 2. In addition, the basket 1 is provided with serial arrangements of circumferential ring 24 connectors 26, arranged at equal distances along the circumference of the circumferential structure, in locations between the serial arrangements of the connecting pipes 25. The serial arrangements of connectors 26 used for connecting individual circumferential rings 24 with each other provide increased stability and strength to the basket 1.

Figure 5:
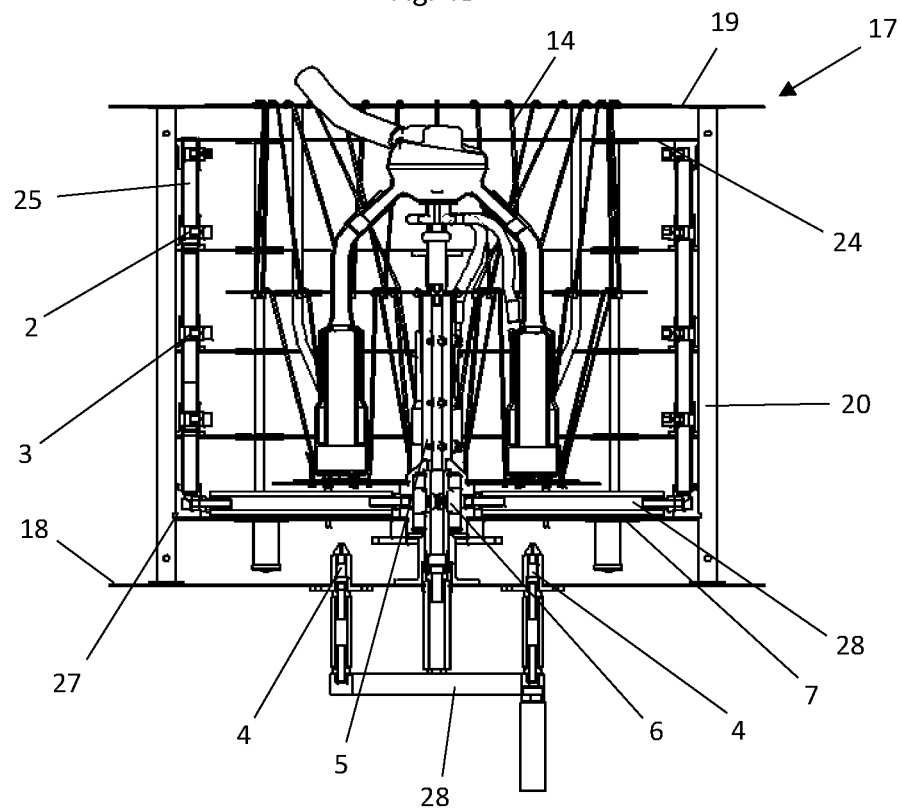
FIG. 5A is a schematic cross-sectional side view of the cleaning system according to a fifth embodiment of the invention with the milking cluster placed inside.
FIG. 5B is a partial cross-sectional axonometric view of the cleaning system of FIG. 5A with the milking cluster placed inside.
FIG. 5C is a schematic cross-sectional side view of the cleaning system which is an enlarged view of the lower part of the cleaning system of FIG. 5A.
FIG. 5D is an axonometric view of the cleaning system basket of FIG. 5A.
FIG. 5E is a schematic cross-sectional side view of the cleaning system basket of FIG. 5D.
FIG. 5F is an axonometric view of the positioning structure of the cleaning system of FIG. 5A.
FIG. 5G is a schematic cross-sectional view of the positioning structure of FIG. 5F with the milking cluster placed inside.
Figure 5:
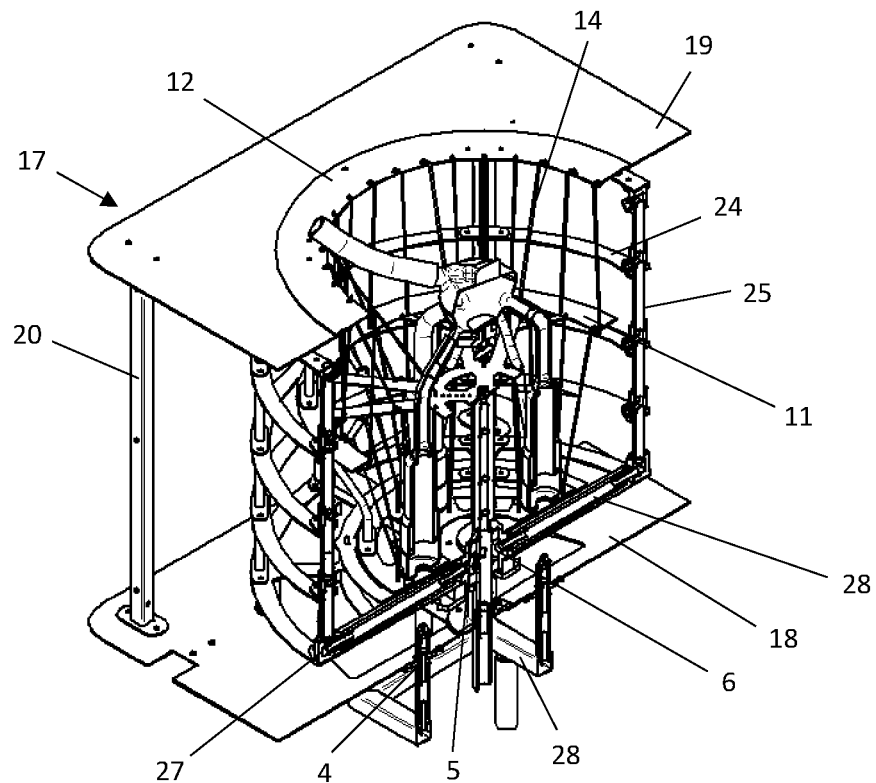
Figure 5C:
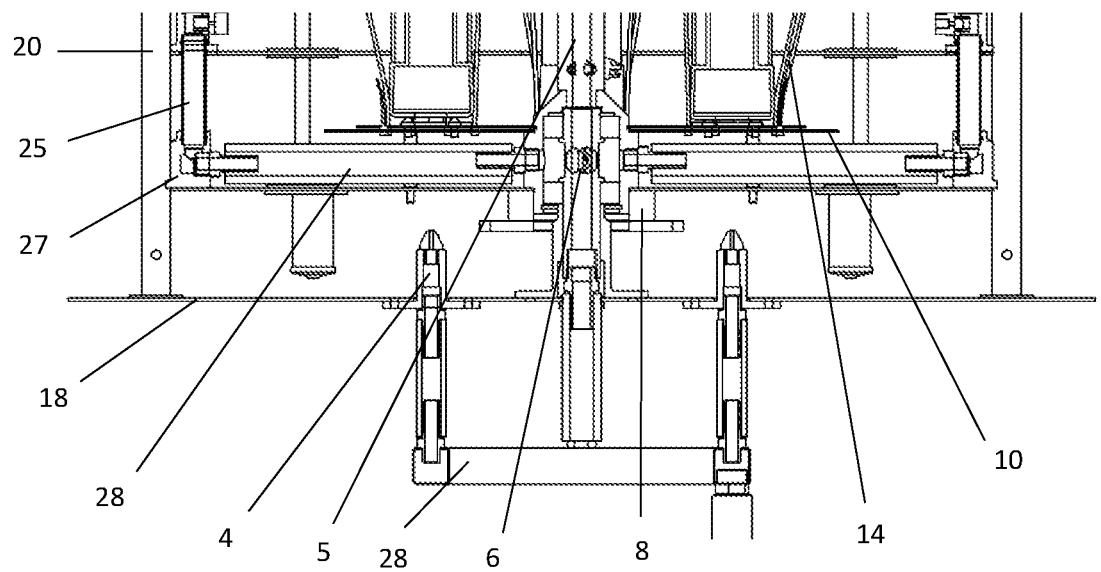
Figure 5D:
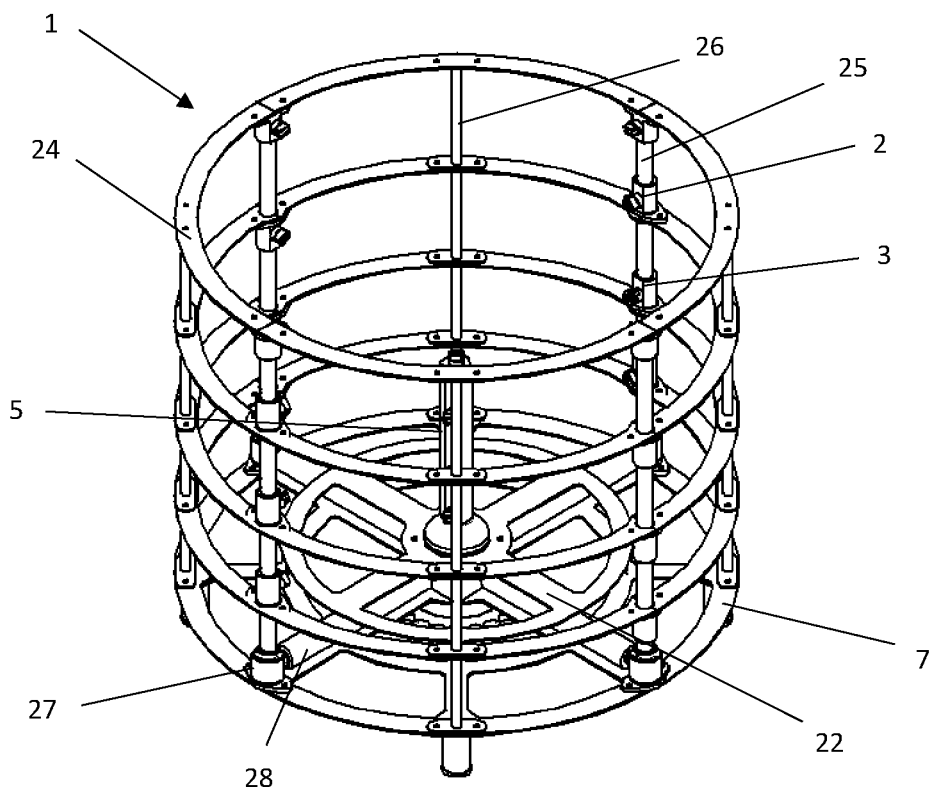
Figure 5E:
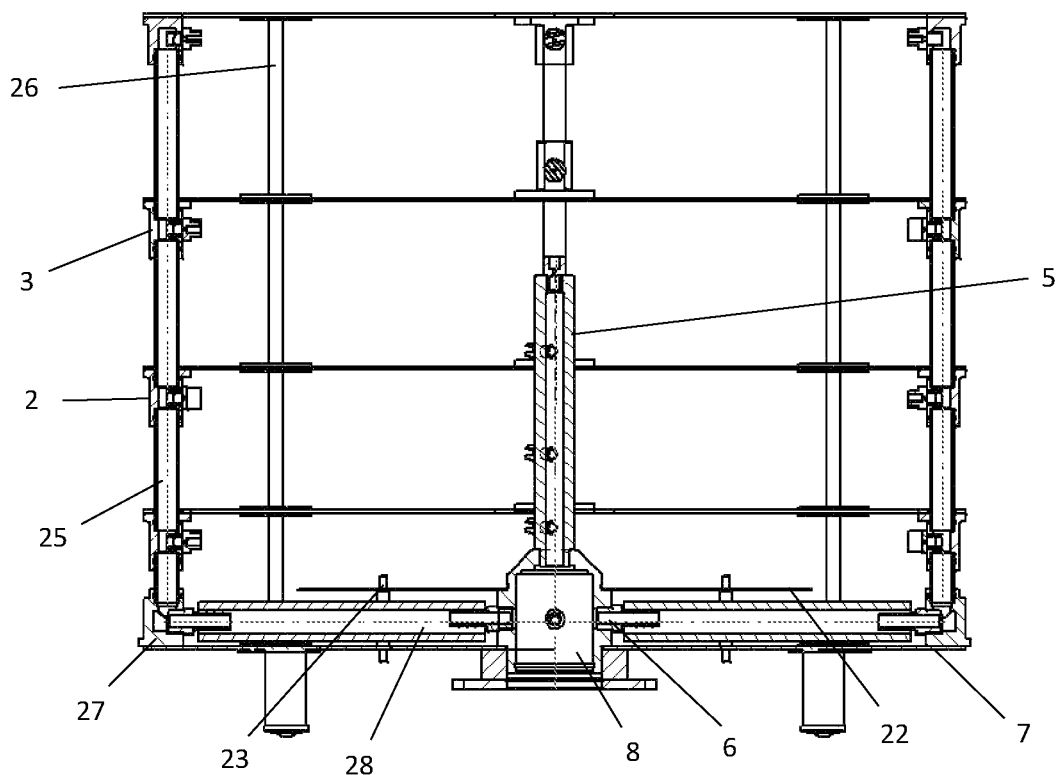
Figure 7:
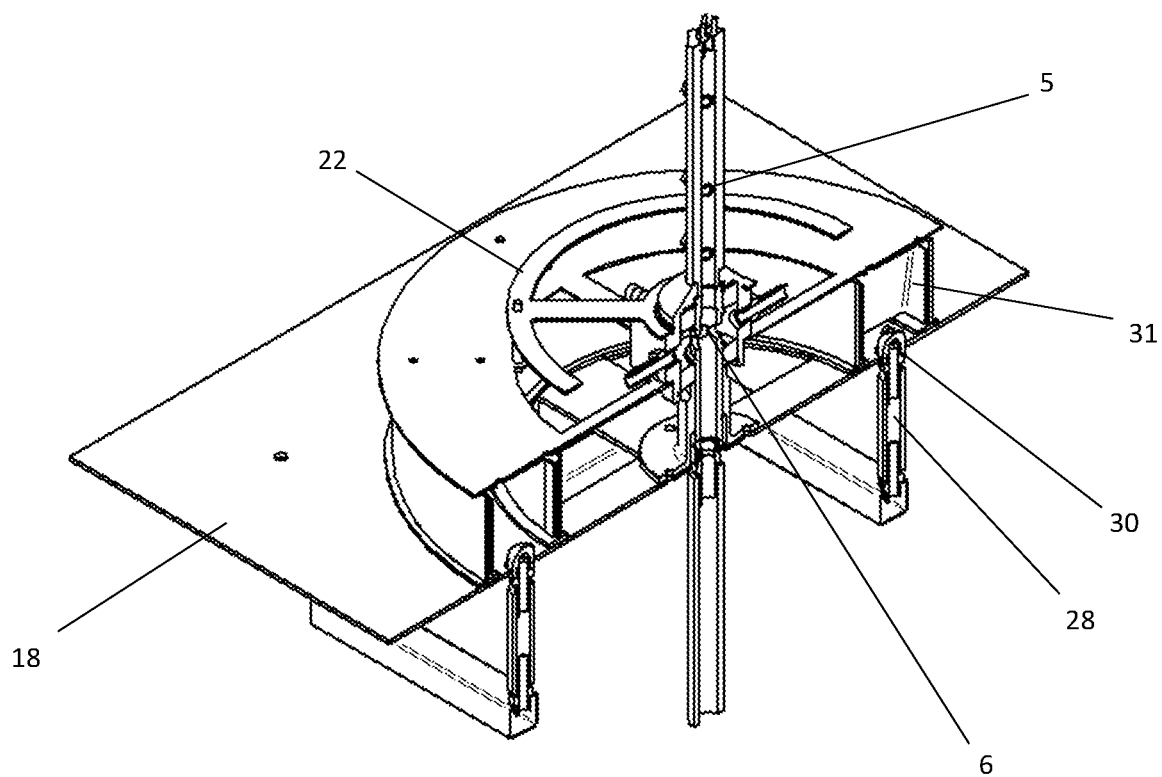
FIG. 7 is a partial cross-sectional axonometric view of an alternative drive system.

As best illustrated in FIG. 5C, a drive system 8 is mounted with its one end to the dispensing head 6 on the side opposite to the inner pin 5, and with its other end to the stationary lower support plate 18. The basket 1, driven by the drive system 8, is thus allowed to rotate with respect to the support structure 17. The type of the drive system 8 used here is not a limitation to the scope of the present invention and different embodiments may make use of a drive system 8 being an electric drive with belt transmission, an electric drive with gear chain transmission, an electric drive with bevel transmission, an electric drive with hybrid transmission, a fluid drive powered with air or a fluid drive powered with liquid. The axonometric view in FIG. 7 shows an alternative construction of the drive system 8 in the form of a fluid drive powered with air/liquid. Generally, the drive system 8 shown in FIG. 7 comprises an annular propulsion duct 31 arranged between the lower support plate 18 and the support plate 22. In addition, propeller nozzles 30 are provided, which eject the propulsion medium (which may be the cleaning agent recovered from the used cleaning agent collected in the bottom part of the cleaning system) under pressure and towards the propulsion blades arranged inside the propulsion duct 31 (not shown). As the pressurized propulsion medium hits the propulsion blades, it sets the drive system 8, and thus the basket 1, in a rotational motion.

The cleaning system is additionally provided with four additional cleaning nozzles 4, which are stream cleaning nozzles. As illustrated in FIGS. 5A-5C, the stream cleaning nozzles 4 are mounted to the lower support plate 18 and are directed towards the basket 1. The stream cleaning nozzles 4 are fluidly connected with the source of a cleaning agent, through the fluid tubes 28. The four stream cleaning nozzles 4 are arranged in positions corresponding to the positions of the liners tensioned in the teat cups of the milking cluster inserted into the basket 1. Thus the four stream cleaning nozzles 4 deliver a stream of a cleaning agent to the inside of the liners, allowing them to be precisely cleaned and removing in particular the milk residue from the previous milking procedure and rinsing the potential environmental bacteria and excreta sucked inside during the removal of the milking cluster after the milking of a cow is finished.

The cleaning system according to the fifth embodiment is additionally provided with a positioning structure 9 which, unlike in the fourth embodiment, is a separate element and is independent from the basket 1. The construction of the positioning structure 9 is presented in detail in FIGS. 5F and 5G. The positioning structure comprises a lower positioning ring 10, a middle positioning ring 11 and an upper positioning ring 12, the positioning rings 10, 11, 12 being arranged in a one-over-another arrangement, at a certain distance from each other. Importantly, it is possible in alternative embodiments to use two rings or more than 3 rings in the construction of the positioning structure 9, depending on the dimensions and components of the milking cluster. The external diameter of the middle positioning ring 11 is smaller than the diameter of the upper positioning ring 12 and larger than the diameter of the lower positioning ring 10. The positioning rings 10, 11, 12 are connected with each other via positioning ring connectors 13, arranged at equal distances along the circumference of the positioning structure 9. The positioning structure 9 additionally comprises a plurality of spokes 14 being stiff metal rods arranged in several in-row arrangements. The spokes 14 are mounted directly to the positioning rings 10, 11, 12 of the positioning structure 9 and form guides for facilitating the positioning of the milking cluster. The first row of the spokes 14 is mounted to the upper positioning ring 12 in appropriate mounting openings which allow the ends of the spokes 14 to be passed through. The second ends of the first row of the spokes 14 are mounted in various positions to the positioning ring 11, also in appropriate mounting openings. The middle positioning ring 11 is provided with positioning ribs 21 which extend towards the rotational symmetry axis of the positioning structure 9 and which define free spaces for inserting teat cups. Part of the openings for mounting the second ends of the first row of the spokes 14 is arranged along the appropriate positioning ribs 21.

Figure 5F:
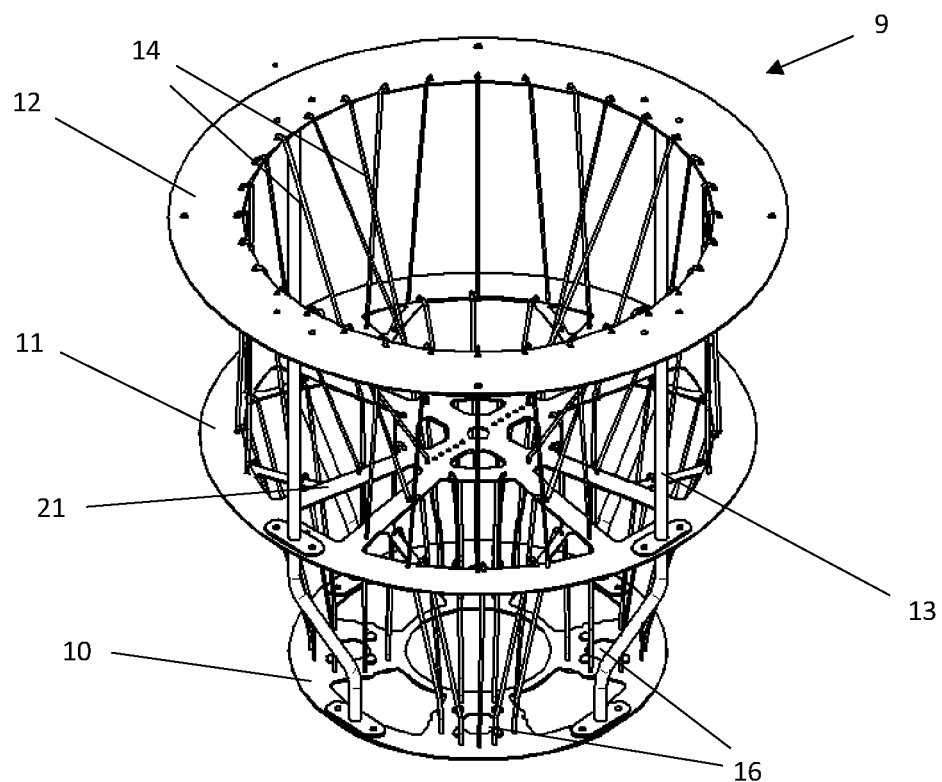
Figure 5G:
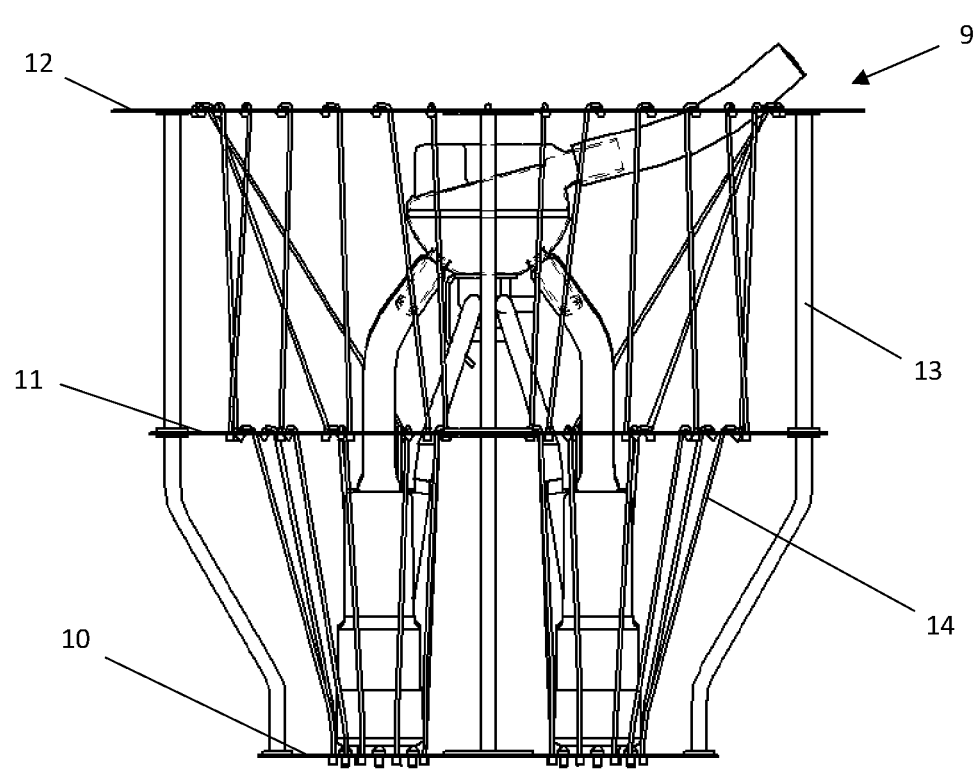

The second row of the spokes 14 extends from the middle positioning ring 11, with the spokes 14 being mounted to the corresponding mounting openings provided in the middle positioning ring 11 and in the lower positioning ring 10. As best shown in FIG. 5F, the mounting openings in the lower positioning ring 10 are provided around the corresponding through holes 16. Thus the spokes 14 in the second row extend from the lower positioning ring 10 towards the middle positioning ring 11, expanding and joining around the space defined by the positioning ribs 21 and by a part of the circumference of the middle positioning ring 11. Such a construction provides a positioning structure 9 which facilitates inserting the milking cluster into the proper position.

During its operation, the positioning structure 9 is inserted through the opening provided in the upper support plate 19 and rests with its upper positioning ring 12 on the upper support plate 19. The positioning structure 9 is thus supported on the stationary support structure 17 in such a way that upon setting the basket 1 in a rotational motion by means of the drive system 8, the positioning structure 9 remains stationary with respect to the basket 1, keeping the milking cluster in a fixed position. As a result, the rotating basket 1, together with the cleaning nozzles 2, 3 arranged on its circumferential structure, allows the dried dirt to be on the one hand cut off from the outer surface of the milking cluster with the use of a cleaning agent emitted from the blade cleaning nozzles 2 and on the other hand rinsed with the use of the conical cleaning nozzles 3. Analogically, the outer surfaces of the milking cluster located on the inner side of the milking cluster are cleaned with streams of a cleaning agent emitted from the cleaning nozzles 2, 3 provided on the inner pin 5, which rotates together with the basket 1. At the same time, as the milking cluster remains in a fixed position, the conical cleaning nozzles 4 provided on the lower support plate 18 deliver a stream of a cleaning agent to the inside of the liners tensioned in the teat cups of the milking cluster, thus cleaning its inner surfaces together with the pulse tubes and the claw.

EXAMPLE 6

Figure 6:
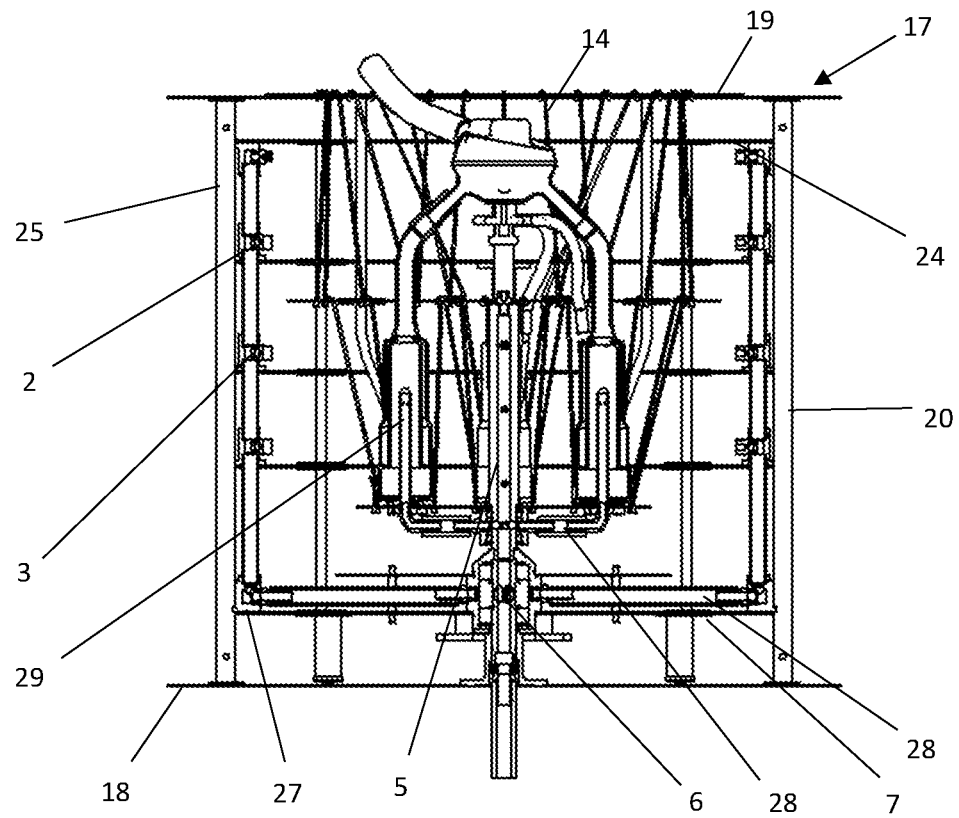
FIG. 6A is a schematic cross-sectional side view of the cleaning system according to a sixth embodiment of the invention with the milking cluster placed inside.
FIG. 6B is a partial cross-sectional axonometric view of the cleaning system of FIG. 6A with the milking cluster placed inside.
FIG. 6C is a partial axonometric cross-sectional view of the cleaning system which is an enlarged view of the lower part of the cleaning system of FIG. 6A.
FIG. 6D is a schematic cross-sectional side view of the cleaning system of FIG. 6A with the milking cluster placed inside and with the indicated cross-sections of streams emitted from the cleaning nozzles arranged on the circumferential structure of the basket.
FIG. 6E is a schematic view of the cleaning system of FIG. 6A with the indicated cross-sections of streams emitted from the cleaning nozzles arranged on the inner pin.
FIG. 6F is a schematic top view of the cleaning system of FIG. 6A with the milking cluster placed inside and with the indicated geometry of streams emitted from the cleaning nozzles arranged on the circumferential structure of the basket.
Figure 6:
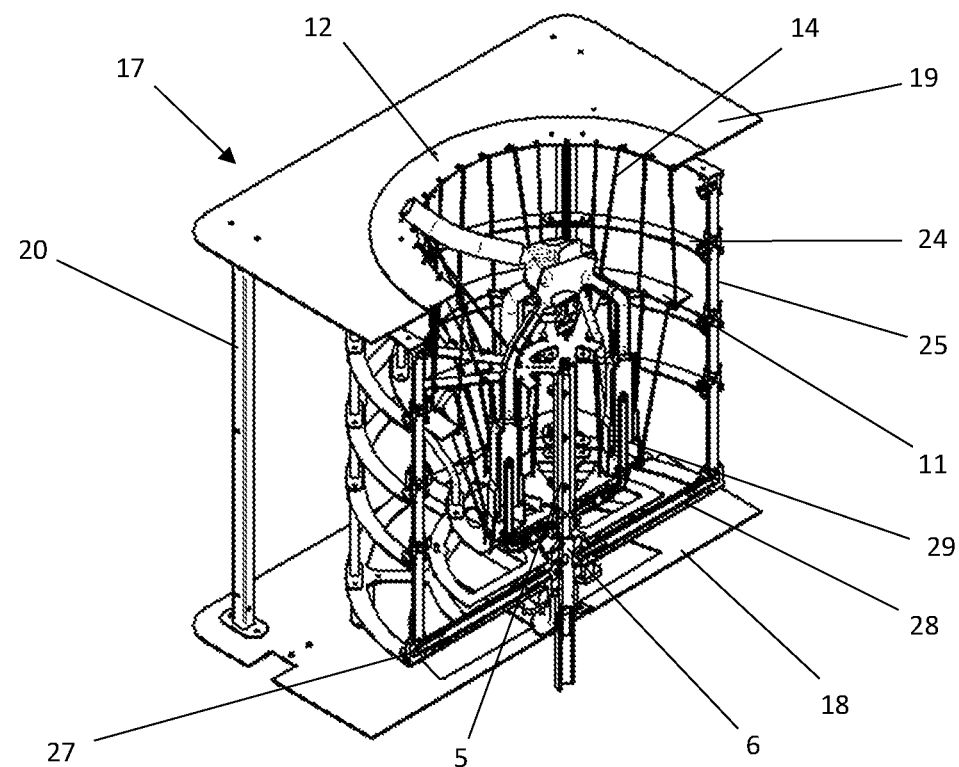
Figure 6C:
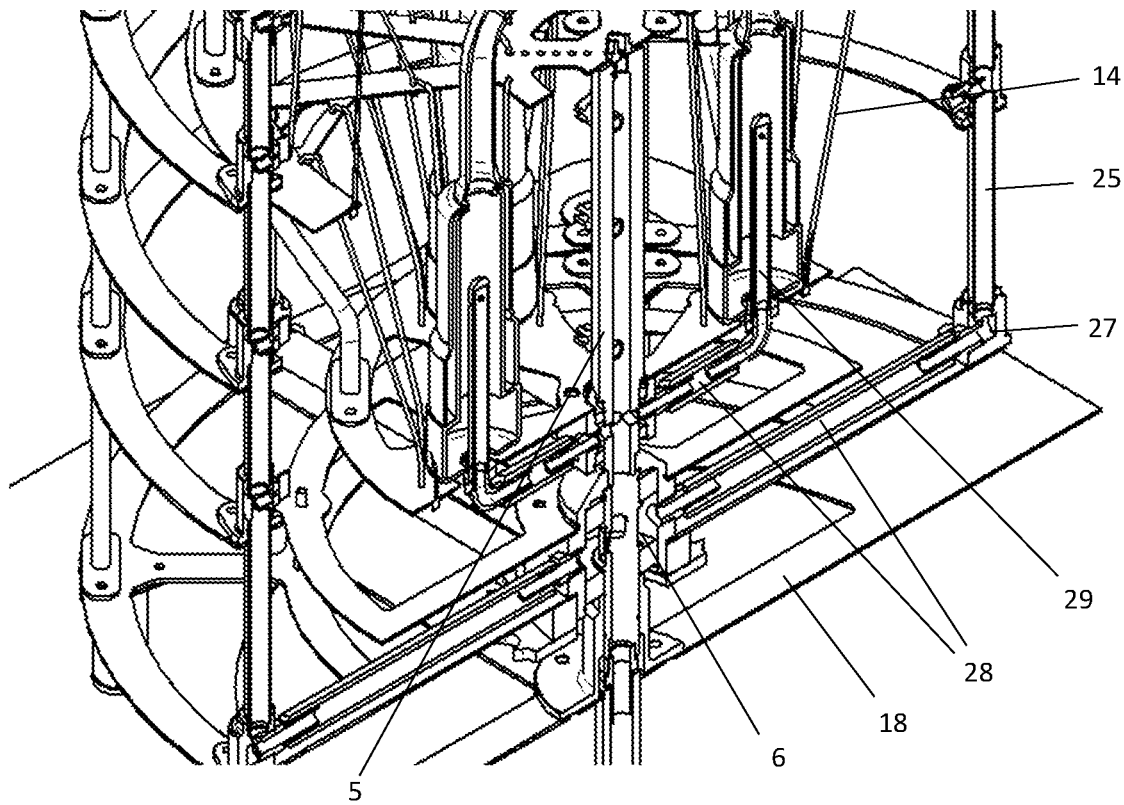

The sixth embodiment of the cleaning system according to the present invention is schematically shown in FIGS. 6A-6C. The structure of the cleaning system according to the sixth embodiment of the invention is similar to the structure of the cleaning system according to the fifth embodiment, and therefore the description of the identical structural elements has been omitted for clarity.

Unlike in the fifth embodiment, the cleaning system of the sixth embodiment is provided not with stream cleaning nozzles 4 but instead with candles 29, which have a structure analogical to the structure shown in the third embodiment of the invention. In this embodiment, the candles 29 are arranged in the circumferential system, in a position above the support plate 22. The positions of the candles 29 correspond to the positions of the openings in the lower positioning ring 10 in such a manner that the teat cups inserted into the cleaning system are inserted onto the candles 29. Importantly, the system of candles 29 is mounted on the inner pin 5, and the candles 29 are fluidly connected with the source of a cleaning agent, remaining in communication with the inner space of the inner pin 5 through appropriate fluid tubes 28.

Figure 6D:
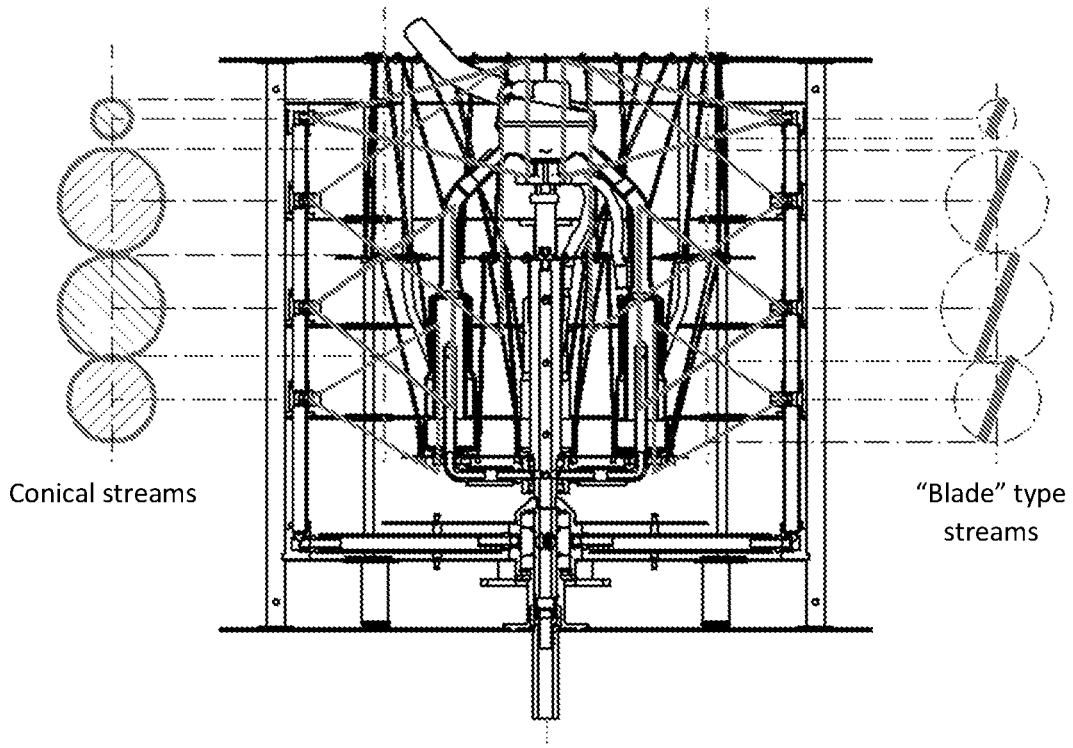
Figure 6E:
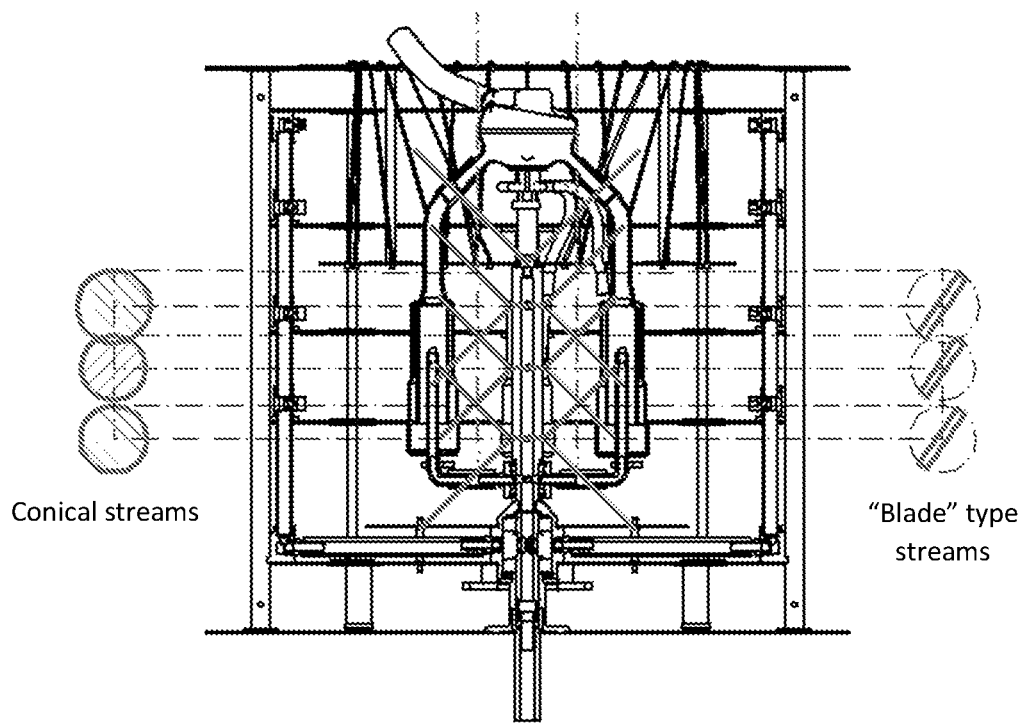
Figure 6F:
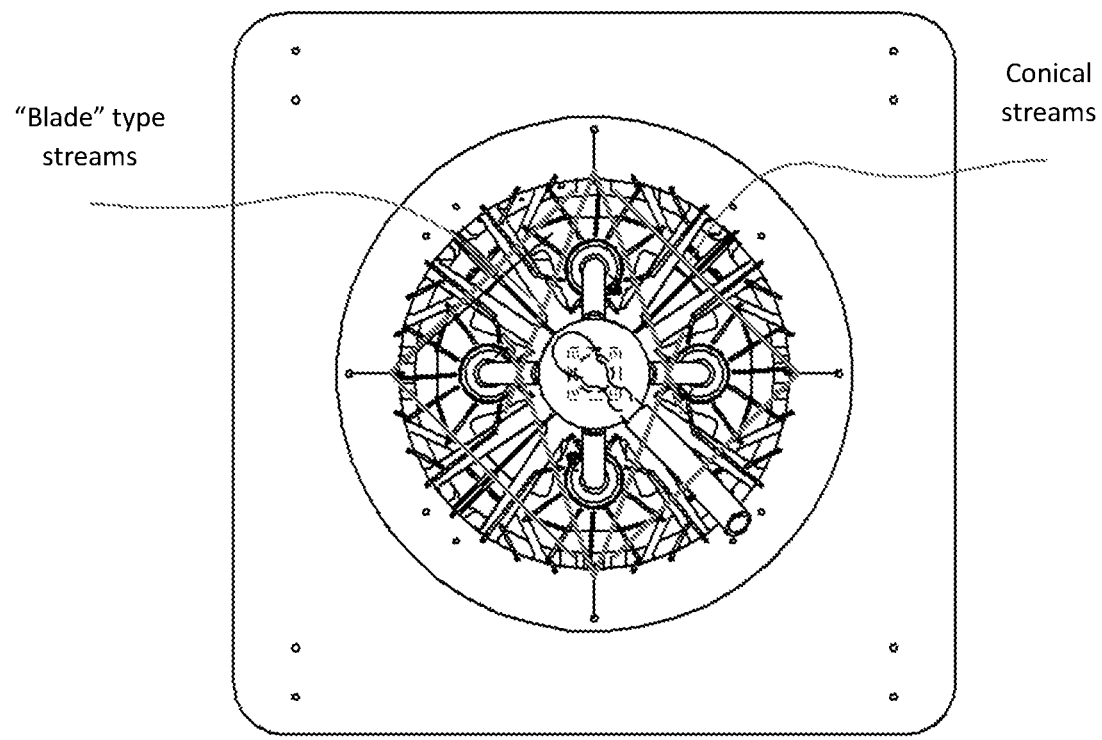

FIGS. 6D and 6F show non-limiting examples of the configurations of cleaning agent streams emitted from the blade cleaning nozzles 2 and from the conical cleaning nozzles 3 located on the circumferential structure of the basket 1. FIG. 6E, in turn, shows configurations of cleaning agent streams emitted from the blade cleaning nozzles 2 and from the conical cleaning nozzles 3 located on the inner pin 5. The hatched circles in FIGS. 6D and 6E represent cross-sections of the cleaning agent streams emitted from the conical cleaning nozzles 3 at the intersection point with the vertical dotted lines, while the hatched slanting rectangles represent cross sections of the cleaning agent streams emitted from the blade cleaning nozzles 2 at the intersection point with the vertical dotted lines. Streams of the cleaning agent emitted from the cleaning nozzles 2, 3 overlap each other at the point of contact with the milking cluster placed inside the cleaning system of the invention, thus allowing the entire surface of the cleaned object to be covered and facilitating the effective cleaning and disinfection of the object. In FIG. 6F, the thick continuous lines indicate the directions of the cleaning agent streams emitted from the conical cleaning nozzles 3 and from the blade cleaning nozzles 2, respectively. Importantly, such configuration and geometry of the cleaning agent streams allows a complete coverage of the outer surfaces of the milking cluster subjected to cleaning, while the dried dirt is additionally "cut off" (during the rotation of the basket 1) by the streams of the cleaning agent emitted from the blade cleaning nozzles 2.

LIST OF REFERENCE NUMERALS

1—basket
2—cleaning (blade) nozzle
3—cleaning (conical) nozzle
4—cleaning (stream) nozzle
5—inner pin
6—dispensing head
7—basket base
8—drive system
9—positioning structure
10—lower positioning ring
11—middle positioning ring
12—upper positioning ring
13—positioning ring connector
14—spoke
15—positioning opening
16—through hole
17—support structure
18—lower support plate
19—upper support plate
20—support plate mounting prop
21—positioning ribs
22—support plate
23—pin
24—basket circumferential ring
25—connecting pipe
26—ring connector
27—connecting elbow
28—fluid tube
29—candle
30—propeller nozzle
31—propulsion duct

The invention claimed is:

1. A cleaning system for a milking cluster, comprising:
a basket with a base and a circumferential structure,
the basket being suitable to receive the milking cluster,
wherein the circumferential structure has a plurality of cleaning nozzles arranged thereon,
wherein said plurality of cleaning nozzles are directed toward an inside of the basket and fluidly connected with a source of a cleaning agent,
a support plate, wherein the support plate
is arranged inside the basket at a distance from the base, and
is connected to the base by pegs,
wherein the cleaning system comprises a drive system for setting the basket in a rotational motion.

2. The cleaning system of claim 1, wherein the basket comprises a dispensing head fluidly connected with the source of the cleaning agent and suitable to deliver the cleaning agent to the plurality of cleaning nozzles through fluid tubes.

3. A cleaning system for a milking cluster, comprising:
a basket with a base and a circumferential structure,
the basket being suitable to receive the milking cluster,
wherein the circumferential structure
includes a plurality of circumferential rings arranged in overlaying arrangement,
wherein the circumferential rings are connected by connecting pipes that are arranged along a circumference of the circumferential structure,
wherein the connecting pipes have a plurality of cleaning nozzles arranged thereon,
wherein said plurality of cleaning nozzles are directed toward an inside of the basket and fluidly connected with a source of a cleaning agent,
wherein the cleaning system comprises a drive system for setting the basket in a rotational motion.

4. The cleaning system of claim 3,
wherein the basket comprises an inner pin arranged coaxially with respect to the basket and extending vertically from the base,
wherein the inner pin has a plurality of further cleaning nozzles arranged thereon and directed toward the outside of the basket,
wherein at least one of the plurality of further cleaning nozzles are arranged at the inner pin end opposite with respect to the base and directed toward the outside of the basket, along an axis of rotational symmetry of the basket,
wherein the further cleaning nozzles are fluidly connected with the source of the cleaning agent.

5. The cleaning system of claim 3, further comprising a stationary support structure including a lower support plate and an upper support plate connected to each other with support plate mounting props, wherein the stationary support structure surrounds the basket.

6. The cleaning system of claim 3, wherein the drive system is coupled to the basket.

7. The cleaning system of claim 3, wherein the drive system is at least one of an electric drive with a belt transmission, an electric drive with a gear chain transmission, an electric drive with a bevel transmission, and an electric drive with a hybrid transmission.

8. The cleaning system of claim 3, wherein the plurality of cleaning nozzles are blade nozzles, conical nozzles or stream nozzles.

* * * * *